US008009307B2

(12) United States Patent
Shutt et al.

(10) Patent No.: US 8,009,307 B2
(45) Date of Patent: Aug. 30, 2011

(54) FAX HANDLING SYSTEM AND METHOD

(76) Inventors: Michael J. Shutt, Marietta, GA (US);
Matthew Todd Hodge, Alpharetta, GA (US)

( * ) Notice: Subject to any disclaimer, the term of this patent is extended or adjusted under 35 U.S.C. 154(b) by 1685 days.

(21) Appl. No.: 10/359,979

(22) Filed: Feb. 6, 2003

(65) Prior Publication Data
US 2006/0126101 A1 Jun. 15, 2006

(51) Int. Cl.
*G06F 3/12* (2006.01)
*G06K 15/00* (2006.01)
*B41J 2/01* (2006.01)
*G06F 15/16* (2006.01)
(52) U.S. Cl. ............... 358/1.15; 358/1.14; 358/1.13; 358/1.1; 347/107.3; 709/247
(58) Field of Classification Search .............. None
See application file for complete search history.

(56) References Cited

U.S. PATENT DOCUMENTS

| | | | | |
|---|---|---|---|---|
| 4,887,162 A * | 12/1989 | Arai | ............... | 358/400 |
| 5,227,893 A * | 7/1993 | Ett | ............... | 358/400 |
| 5,255,106 A * | 10/1993 | Castro | ............... | 358/400 |
| 5,506,697 A * | 4/1996 | Li et al. | ............... | 358/448 |
| 6,157,464 A * | 12/2000 | Bloomfield et al. | ........... | 358/407 |
| 6,157,706 A * | 12/2000 | Rachelson | ............... | 379/100.08 |
| 6,625,642 B1 * | 9/2003 | Naylor et al. | ............... | 709/206 |
| 2002/0002481 A1 * | 1/2002 | Uchio et al. | ............... | 705/9 |
| 2006/0126101 A1 * | 6/2006 | Shutt et al. | ............... | 358/1.15 |

OTHER PUBLICATIONS

U.S. Appl. No. 10/160,478 entitled "Document Management System and Method," filed May 31, 2002.

* cited by examiner

*Primary Examiner* — Twyler L Haskins
*Assistant Examiner* — Marcus T Riley
(74) *Attorney, Agent, or Firm* — Nelson Mullins Riley & Scarborough, LLP

(57) ABSTRACT

A system and method for detecting interruptions that occur during the process of sending images of a set of source pages via facsimile transmission and determining that two separate transmissions are associated with each other. An initial fax transmission is received, and its interruption is automatically determined. The initial transmission is automatically matched with a subsequent transmission. A method for receiving one or more documents transmitted from a user via facsimile transmission which identifies and corrects an error in the document(s) received includes receiving one or more document via facsimile transmission and identifying the existence of any of a predetermined set of errors in the transmission. The identified errors are corrected through subsequent transmissions and/or manual user intervention in response to a logical set of predetermined options.

11 Claims, 25 Drawing Sheets

Repository System Layout

Figure 1  Repository System Layout
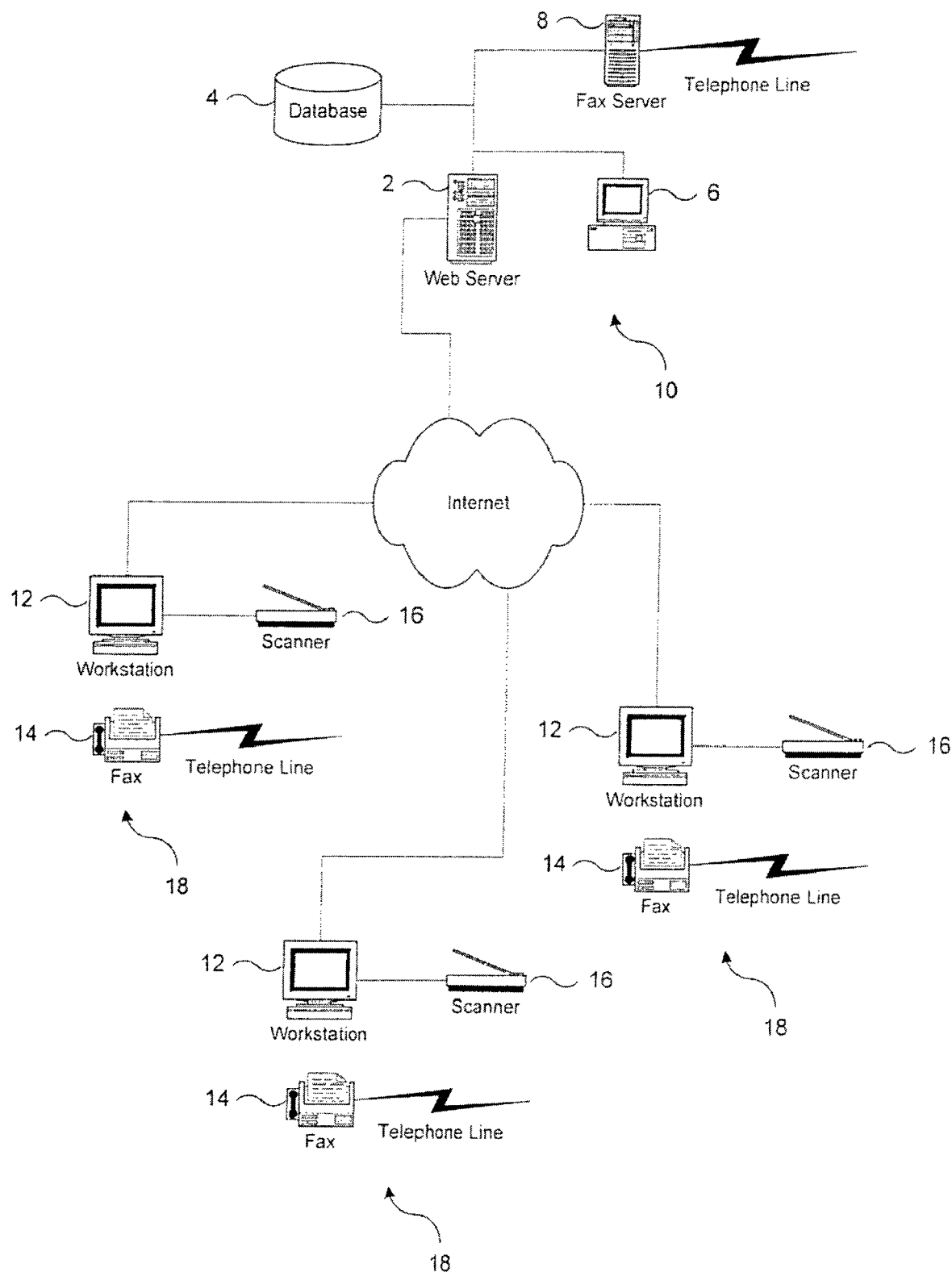

Figure 2 System Components
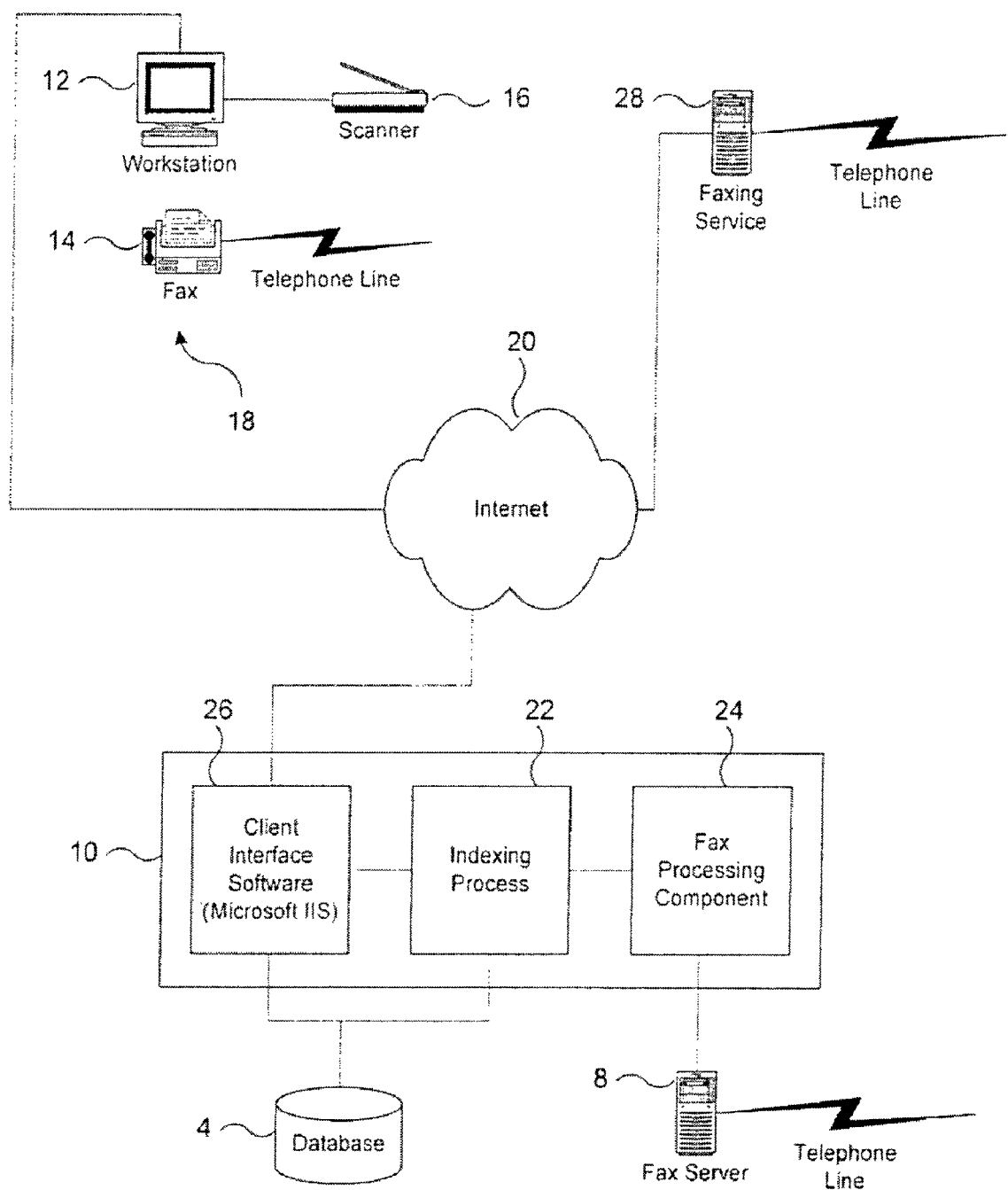

Figure 3  Screenshot of Folder View page
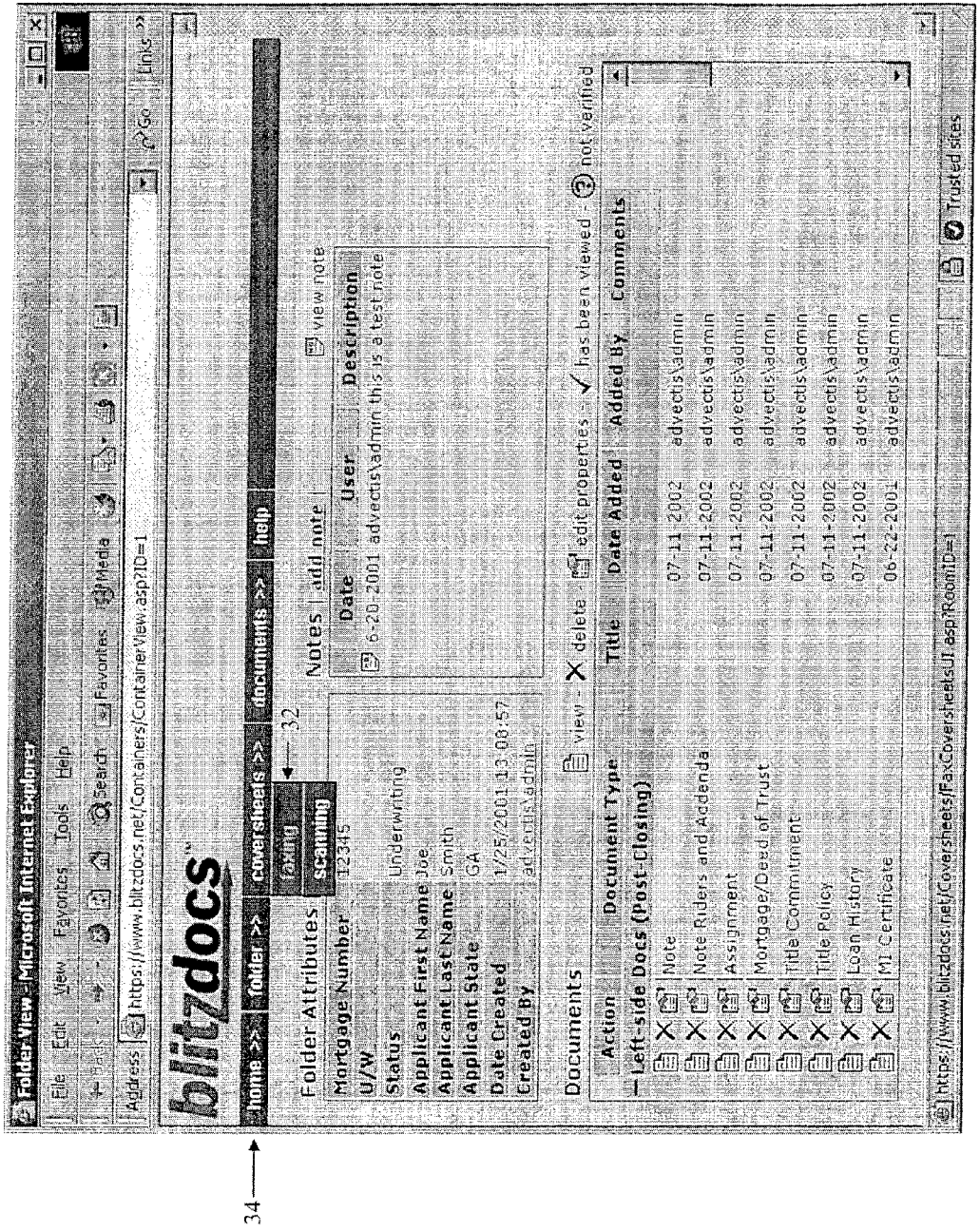

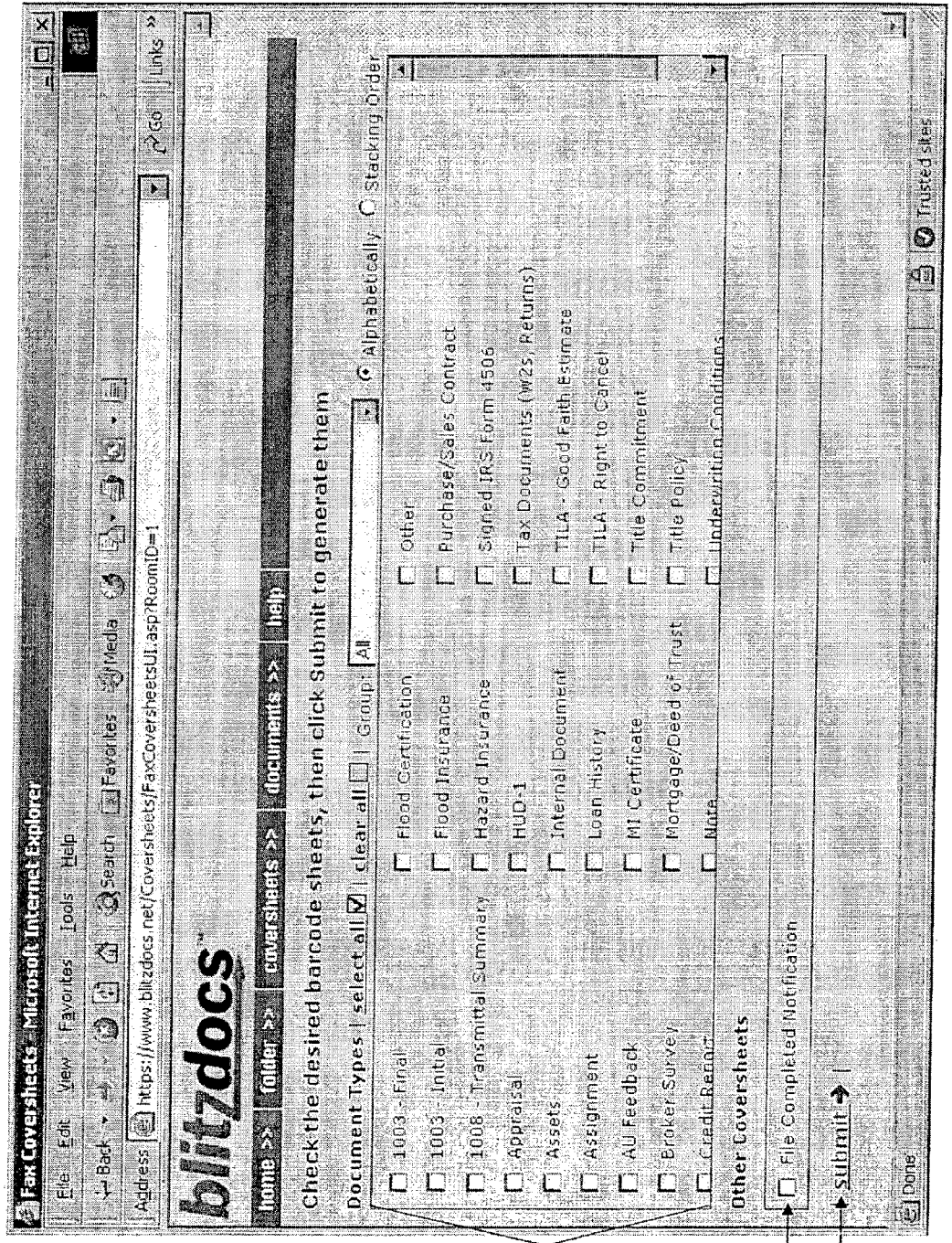
Figure 4  Screenshot of the Fax Coversheets Generation Page

Figure 5  Screenshot of an Example Fax Coversheet

Figure 6  Screenshot of an Example Scanning Coversheet
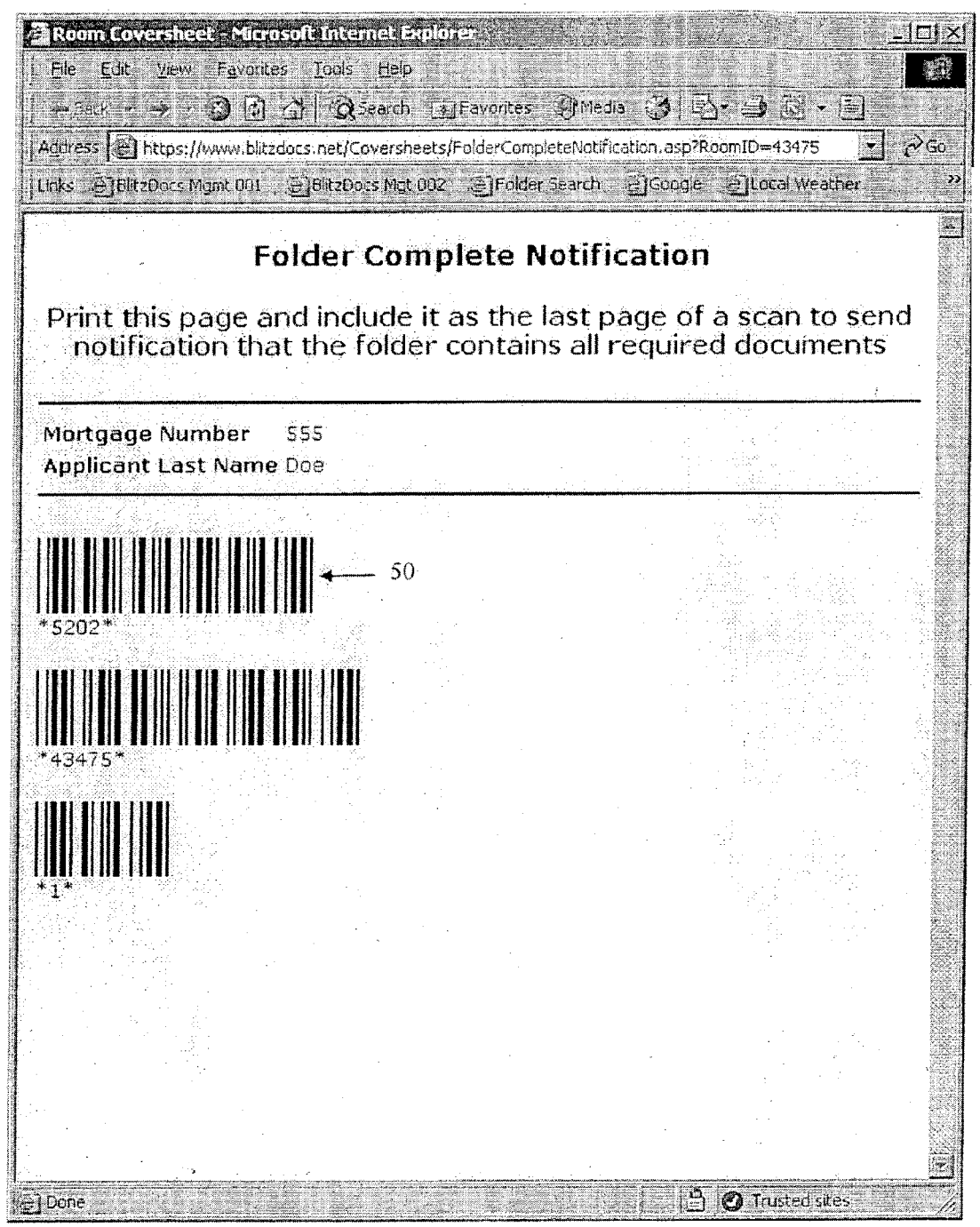

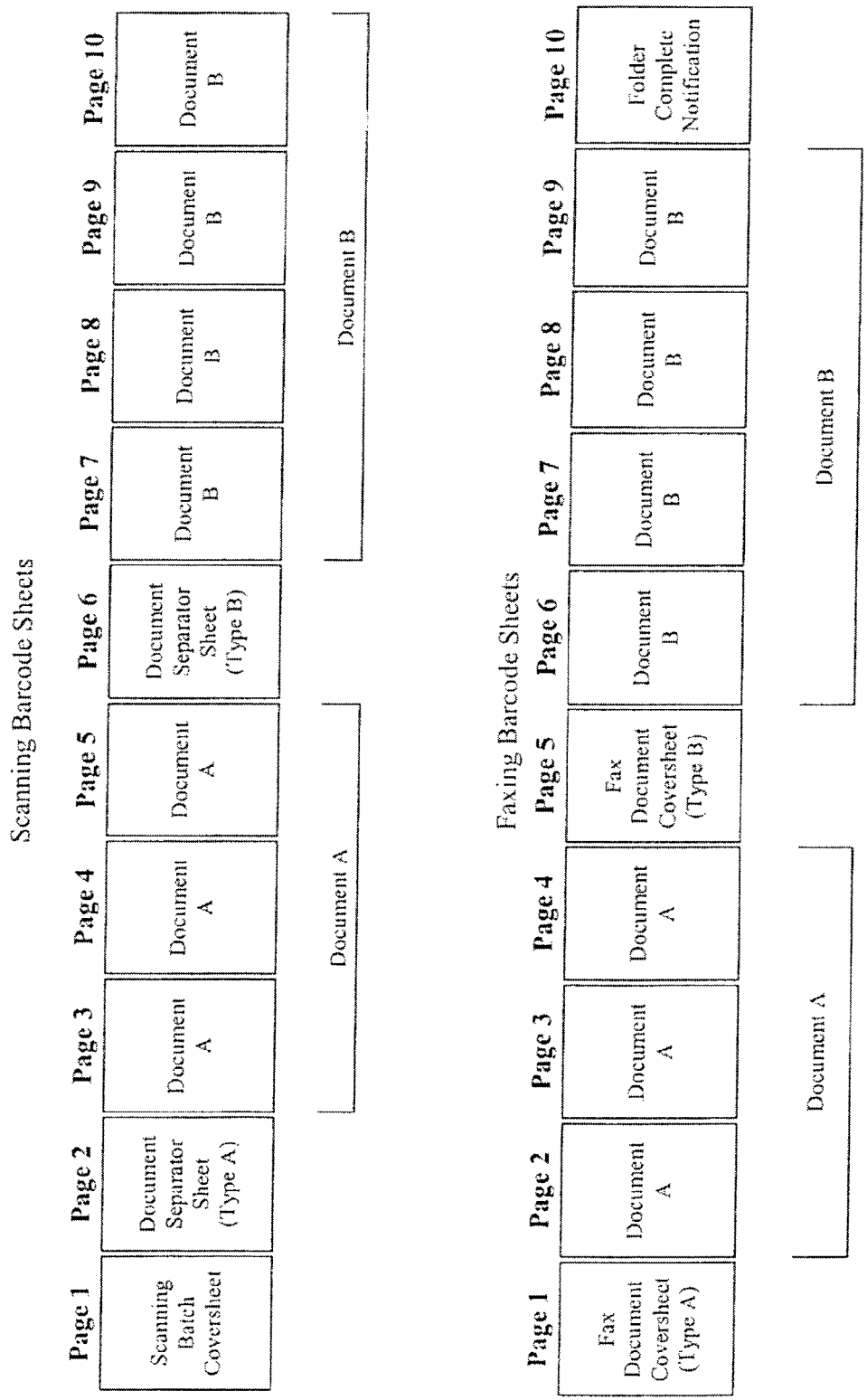
Figure 7  Example Placement of Barcodes

Figure 8  Currently Defined Barcode Attribute Values

| Attribute ID | Data Type | Description |
| --- | --- | --- |
| 1 | 4-byte integer | ID of the folder in which the associated documents are to be indexed |
| 2 | 2-byte integer | ID of the document type to be applied to the associated document |
| 3 | string | Title of the associated document |
| 4 | string | Comments for the associated document |
| 5 | GUID | ID of the user that generated the coversheet |
| 6 | GUID | ID of an access code |
| 7 | 1-byte integer | ID of a notification action to be taken by the system |
| 8 | string | coversheet ID and checksum (the ID corresponds to additional information stored in the database) |

Figure 9  Currently Defined Barcode Template Types

| Template Type ID | Expected Location | Marks Document Span | Parent Template ID | Child Template ID |
|---|---|---|---|---|
| 1 | first page | False | | 3 |
| 2 | none | True | | |
| 3 | none | True | 1 | |
| 4 | first page | True | | |
| 5 | last page | False | | |

Figure 10  Currently Defined Barcode Templates

| Template ID | Template Type ID (refer to Figure 9) | Description | Attribute Values | | | |
|---|---|---|---|---|---|---|
| | | | Value ID (refer to Figure 78) | Template Index | Required | Count |
| 1 | 1 | Scanning Batch Coversheet | 1 | 0 | Yes | 1 |
| | | | 5 | 1 | No | 1 |
| | | | 6 | 2 | No | 1 |
| 2 | 2 | Fax Coversheet | 1 | 0 | Yes | 1 |
| | | | 2 | 1 | Yes | 1 |
| | | | 3 | 2 | No | 1 |
| | | | 4 | 3 | No | 1 |
| | | | 5 | 4 | No | 1 |
| | | | 6 | 5 | No | 1 |
| 3 | 3 | Scanning Document Separator Sheet | 1 | 0 | Yes | 1 |
| | | | 2 | 1 | No | 1 |
| | | | 3 | 2 | No | 1 |
| 4 | 4 | To-be-classified Documents Coversheet | 1 | 0 | Yes | 1 |
| | | | 4 | 1 | No | 1 |
| | | | 6 | 2 | No | 1 |
| 5 | 5 | Notification Barcode Sheet | 1 | 0 | Yes | 1 |
| | | | 6 | 1 | No | 1 |
| | | | 7 | 2 | Yes | 1 |
| 6 | 2 | ID-based Document Coversheet | 8 | 0 | Yes | 6 |
| 7 | 5 | ID-based Notification Coversheet | 8 | 0 | Yes | 6 |

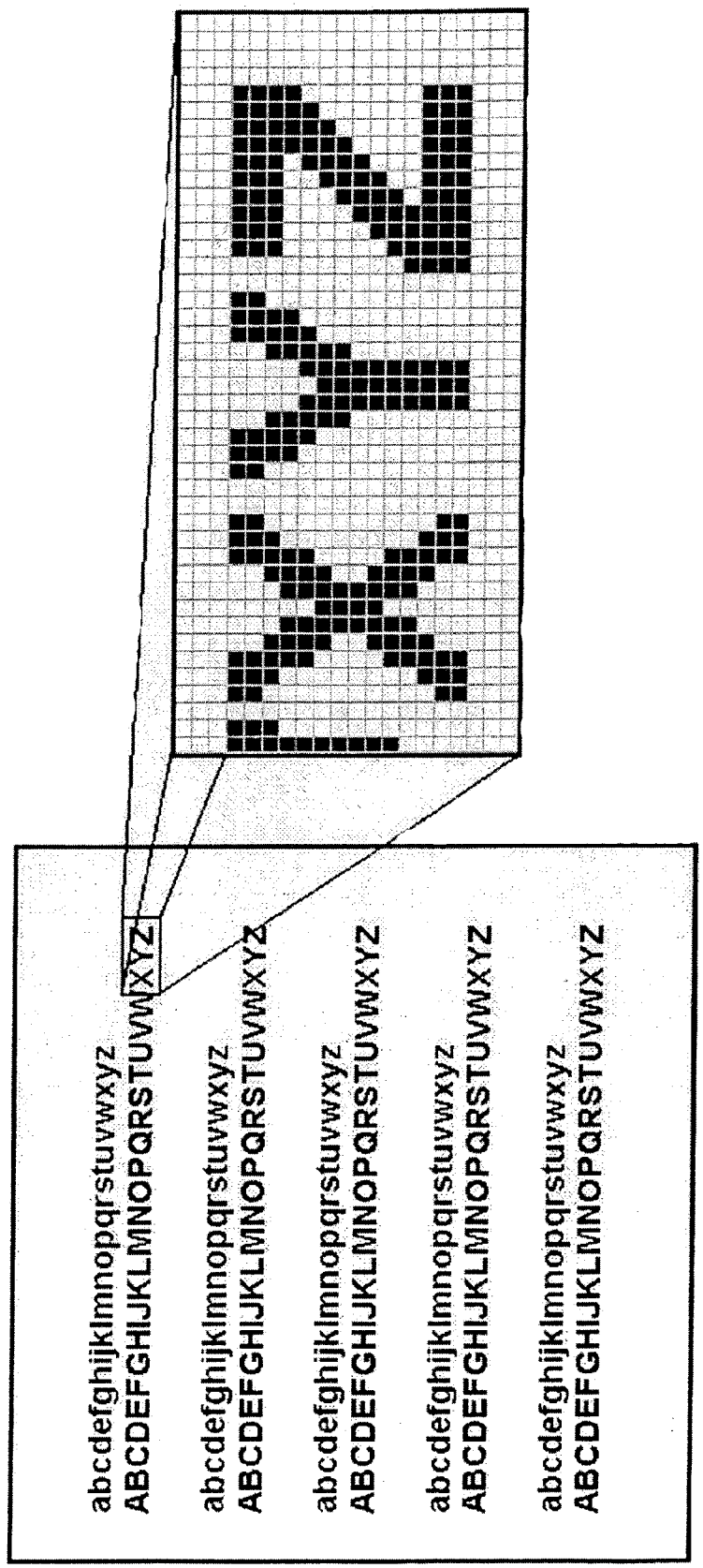
Figure 11 Illustration of Raster Graphics

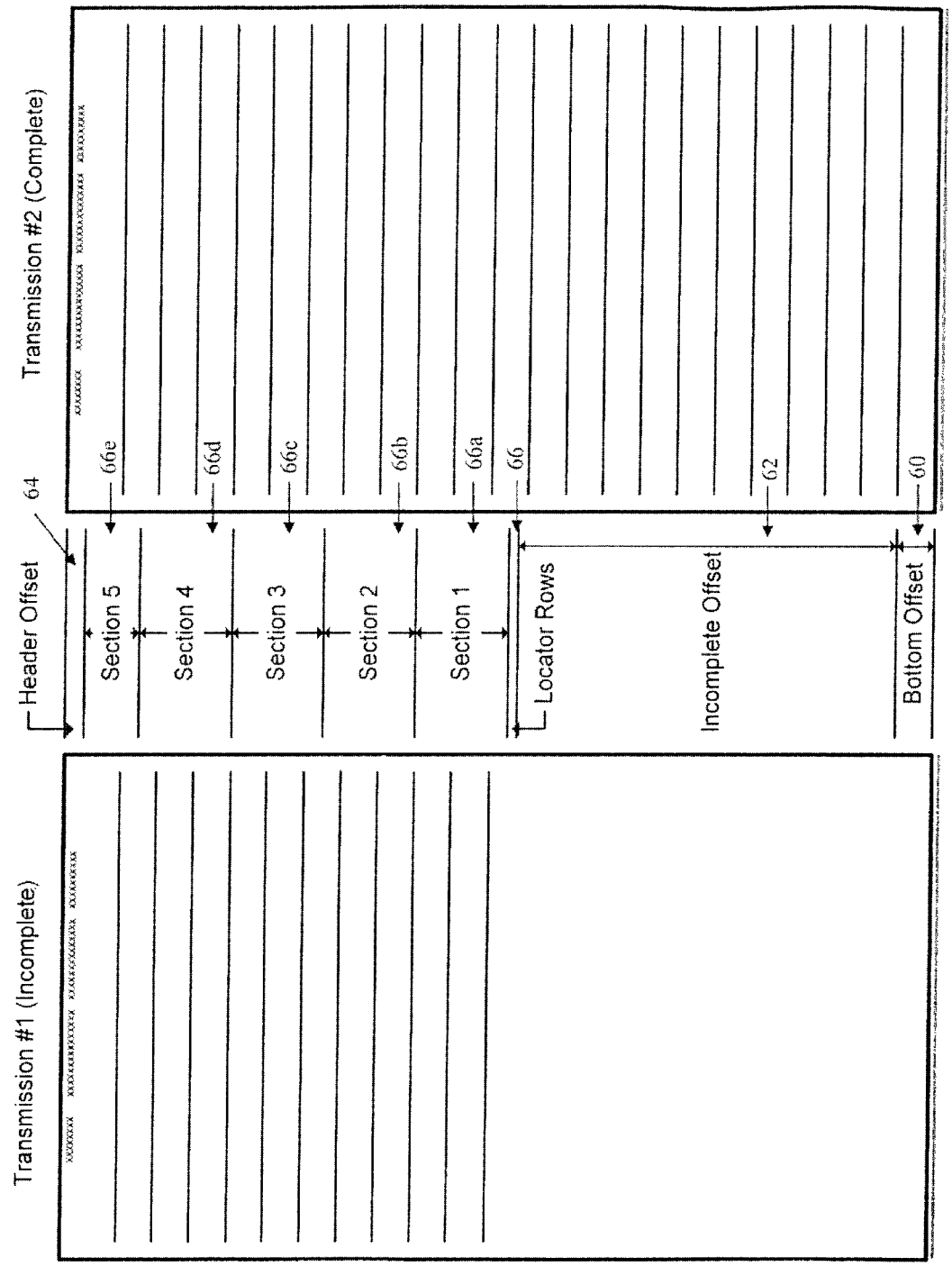
Figure 12 Comparison of Page Bitmaps

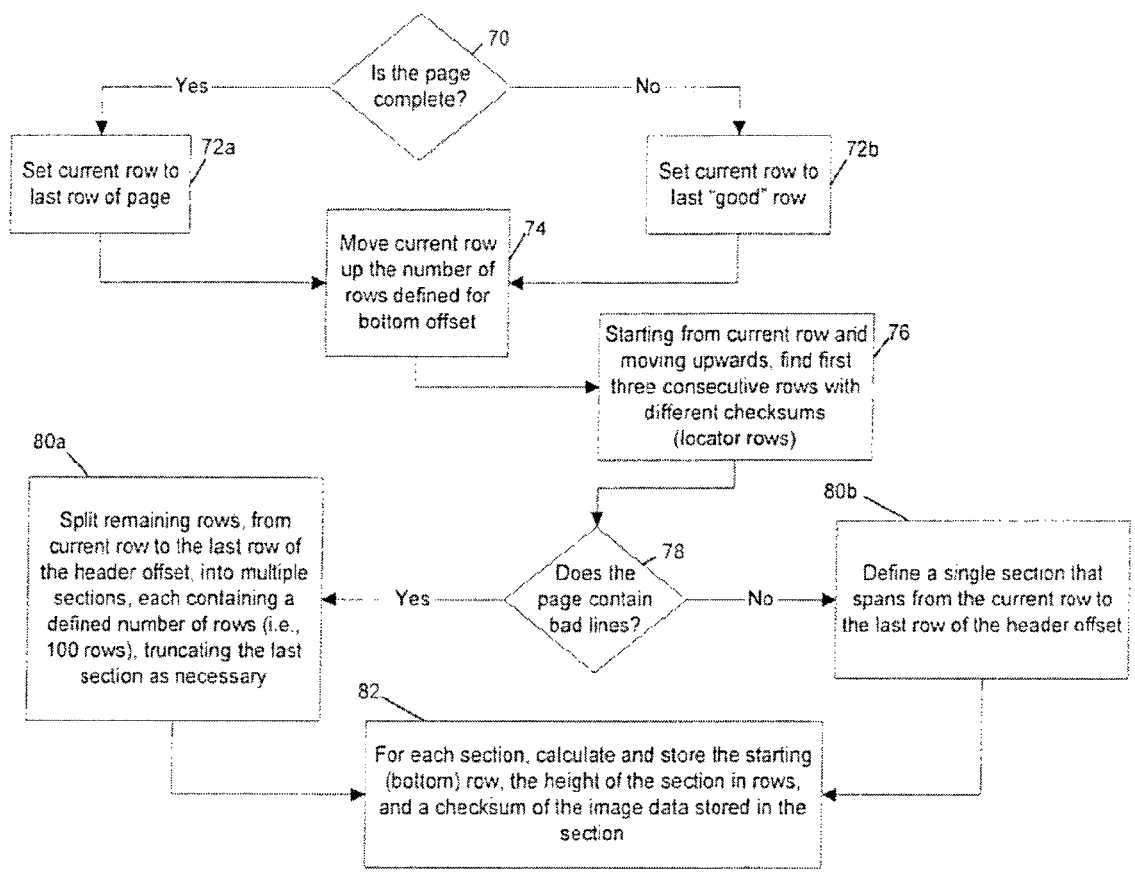
Figure 13a Page Comparison Logic

Figure 13b  Page Comparison Logic
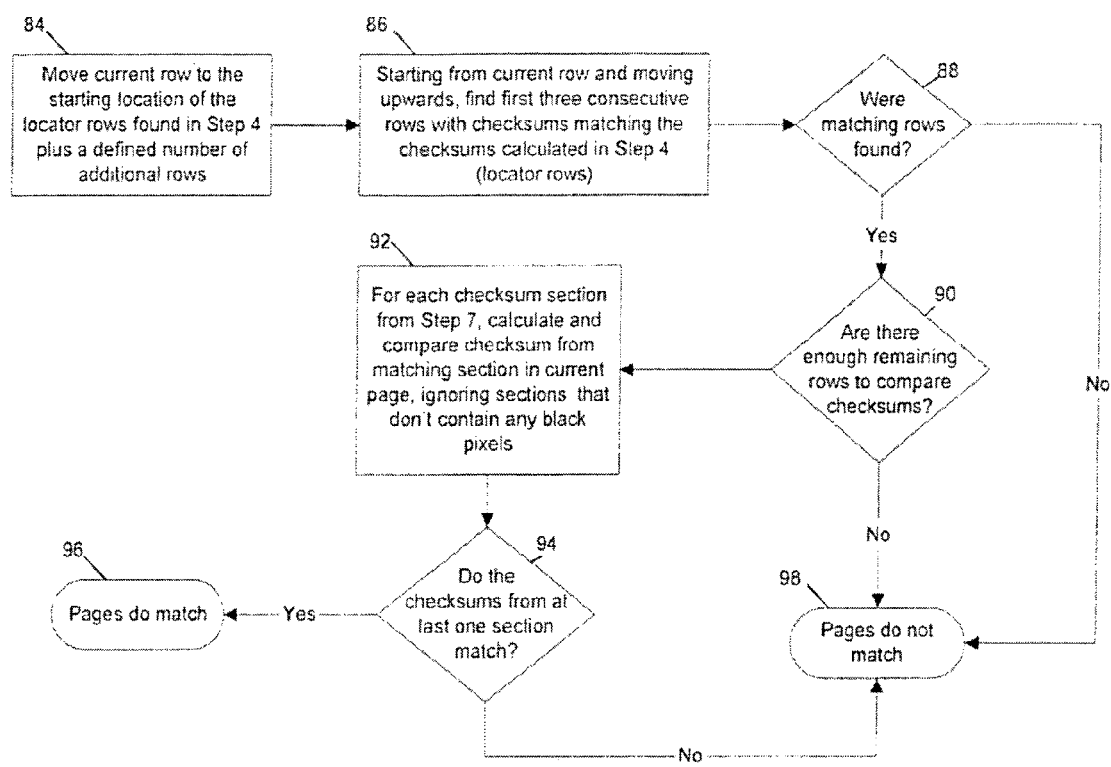

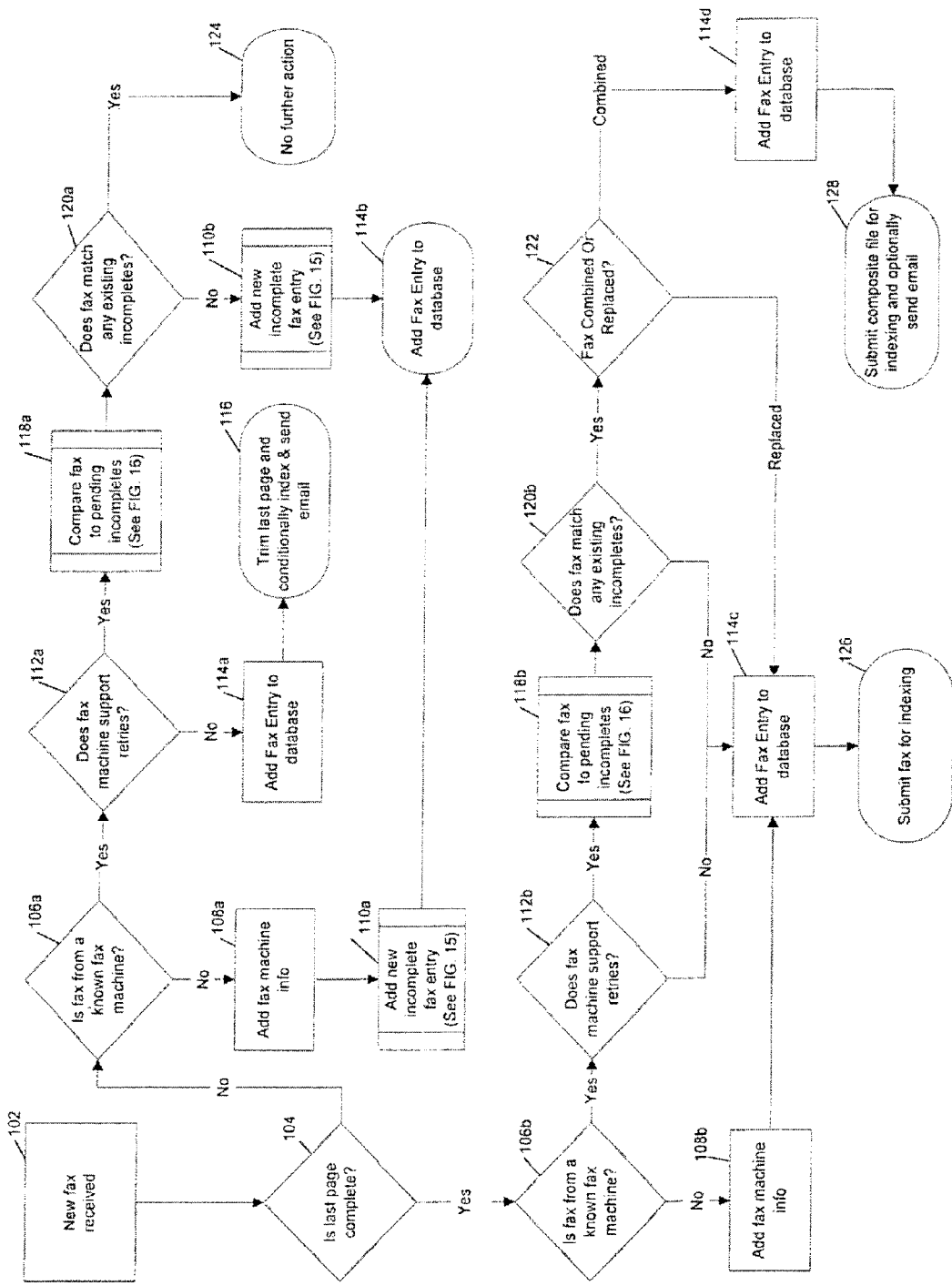
Figure 14 Flow Diagram for Processing a Received Fax

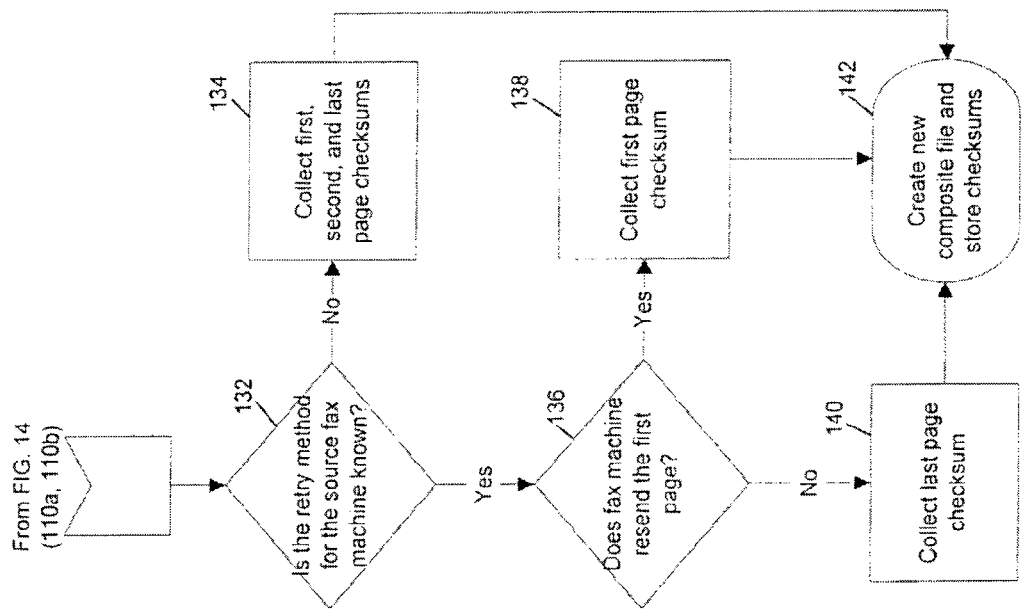
Figure 15 Flow Diagram for Adding a New Incomplete Fax Entry

Figure 16 Flow Diagram for Comparing a New Fax to a Pending Incomplete Fax
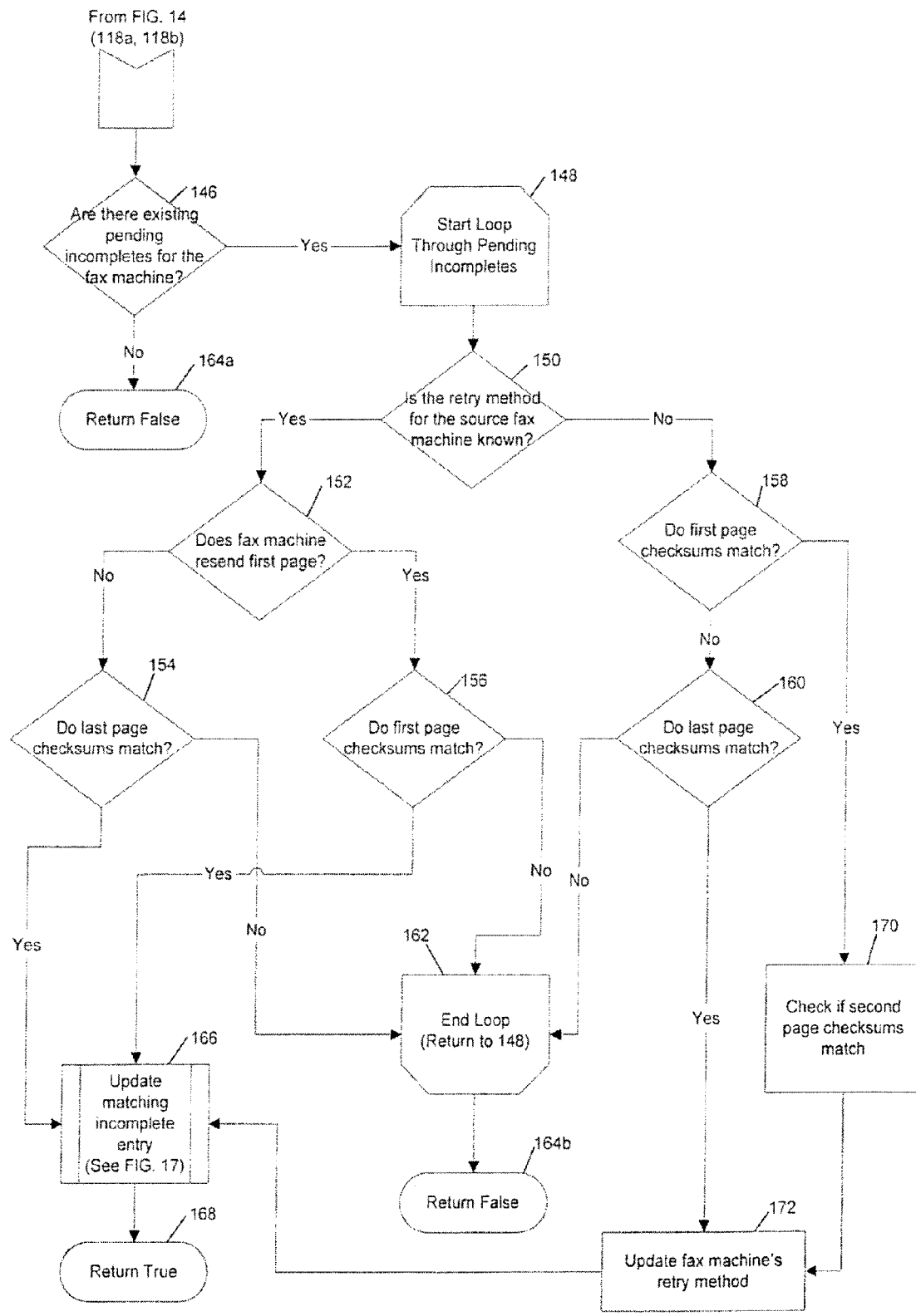

Figure 17 Flow Diagram for Combining a New Fax with a Matching Incomplete Fax
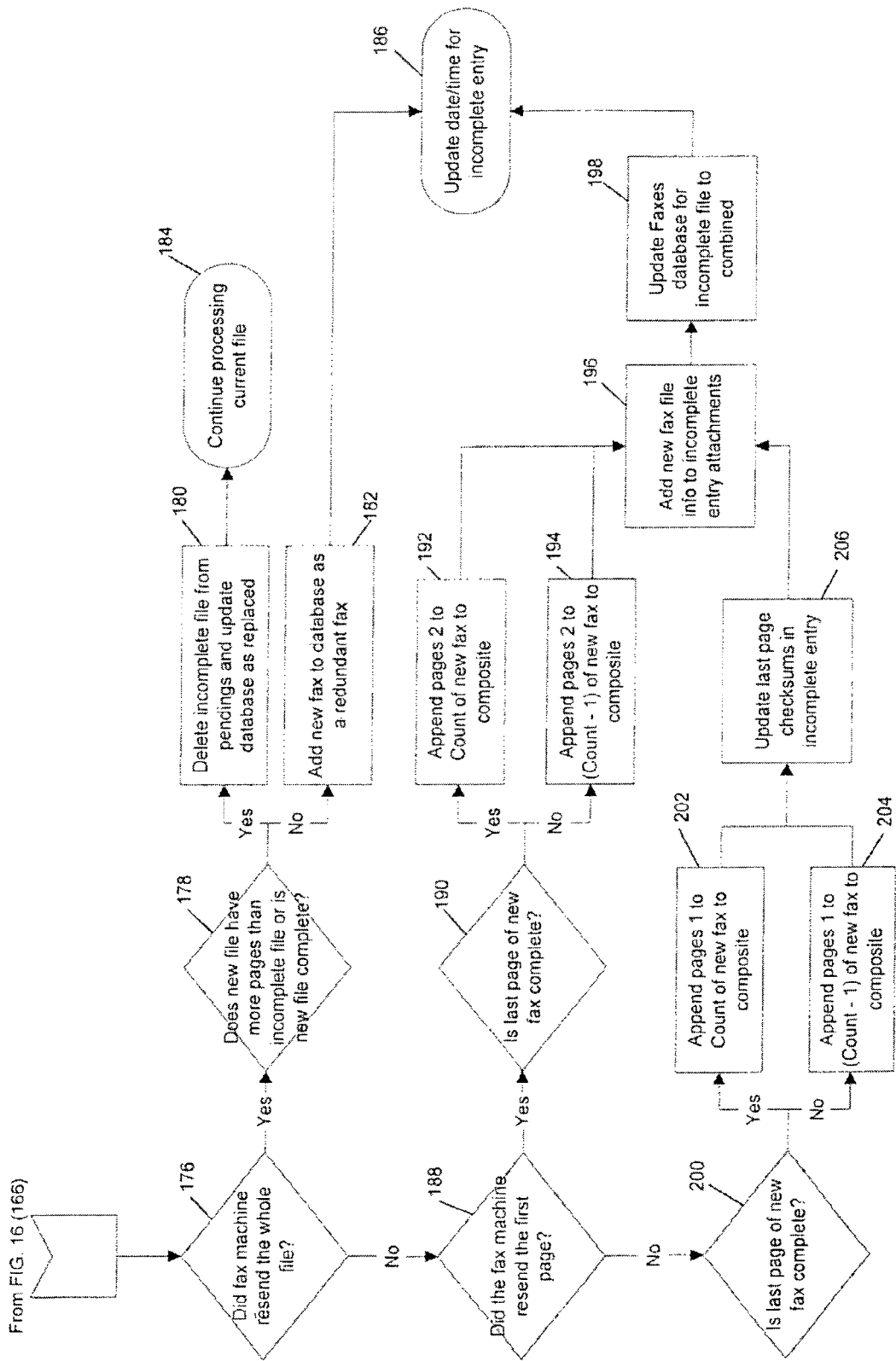

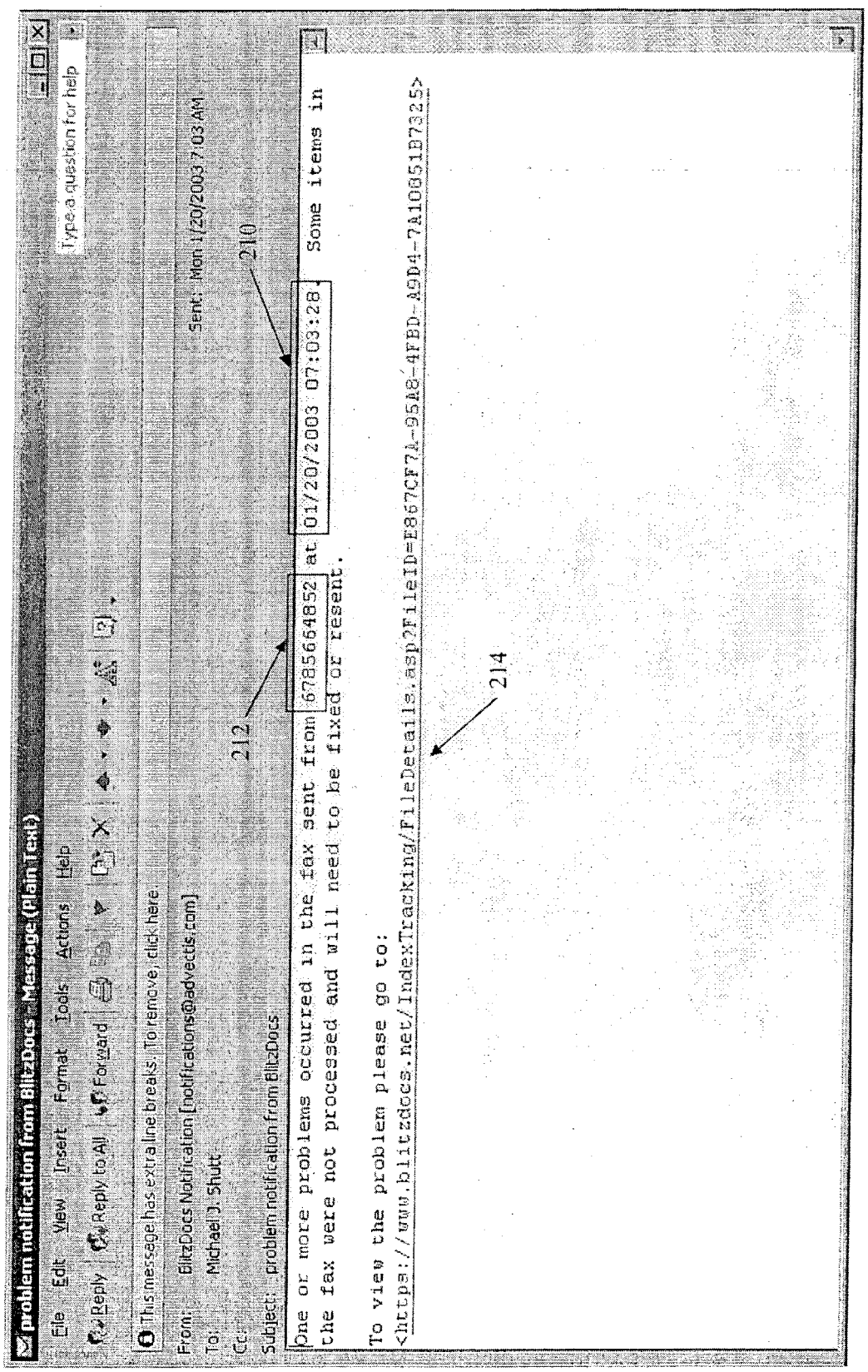
Figure 18 Example Notification

Figure 19 Example of Fax Problem Information Screen

Figure 20  Example of Problem Information Sheet with Details

Figure 21 Example of Corrective Options Screen
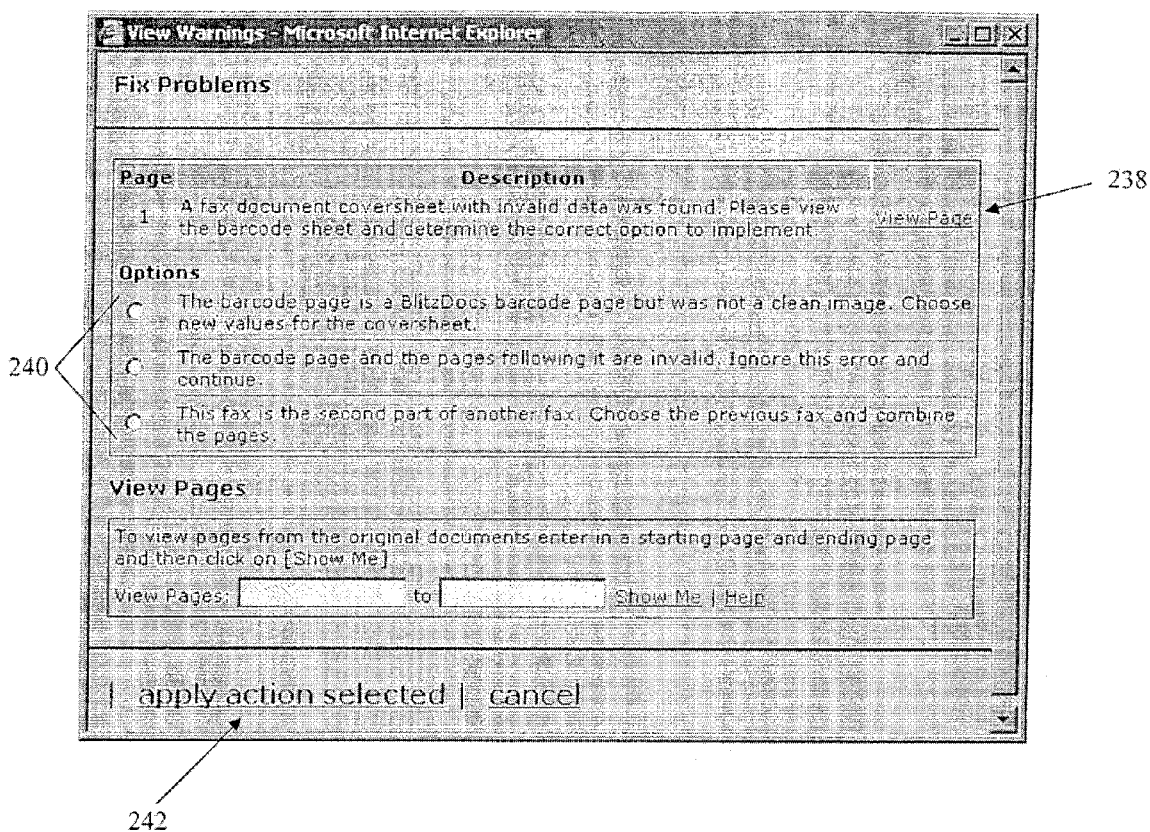

Figure 22 Manual Edit Mode Illustration
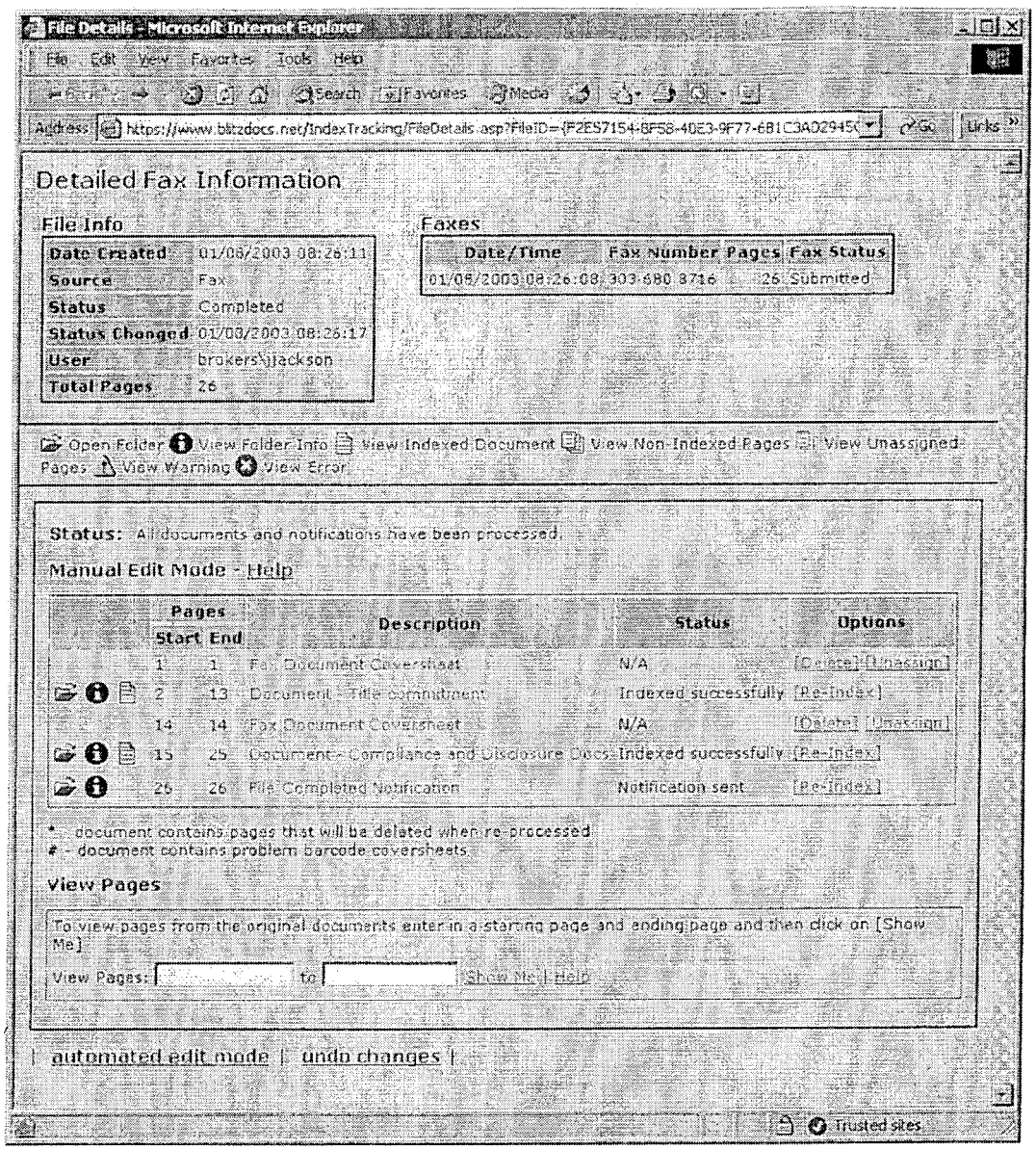

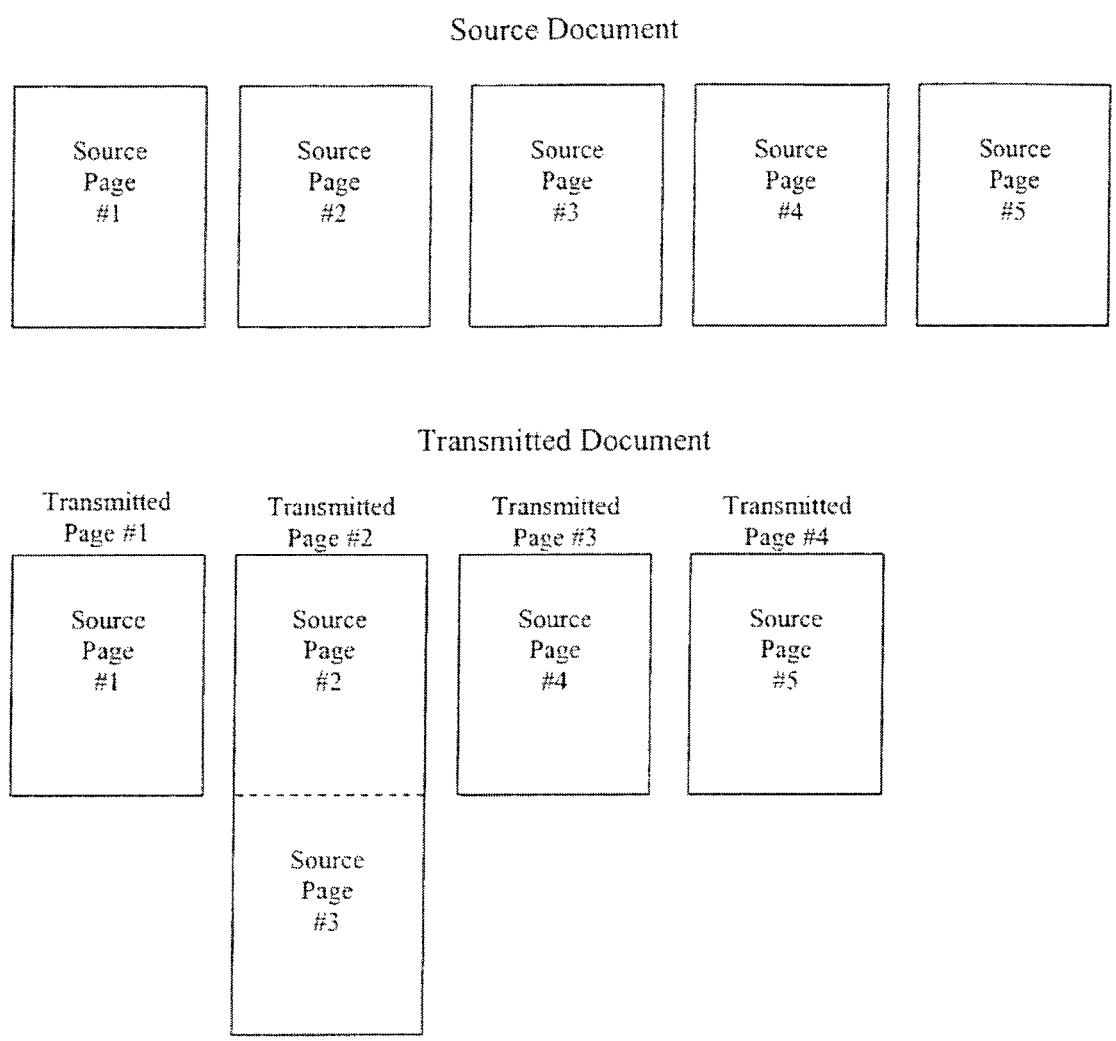
Figure 23 Illustration of Possible Misfeed Results

Figure 24 Entity Relationship Diagram For Database Tables
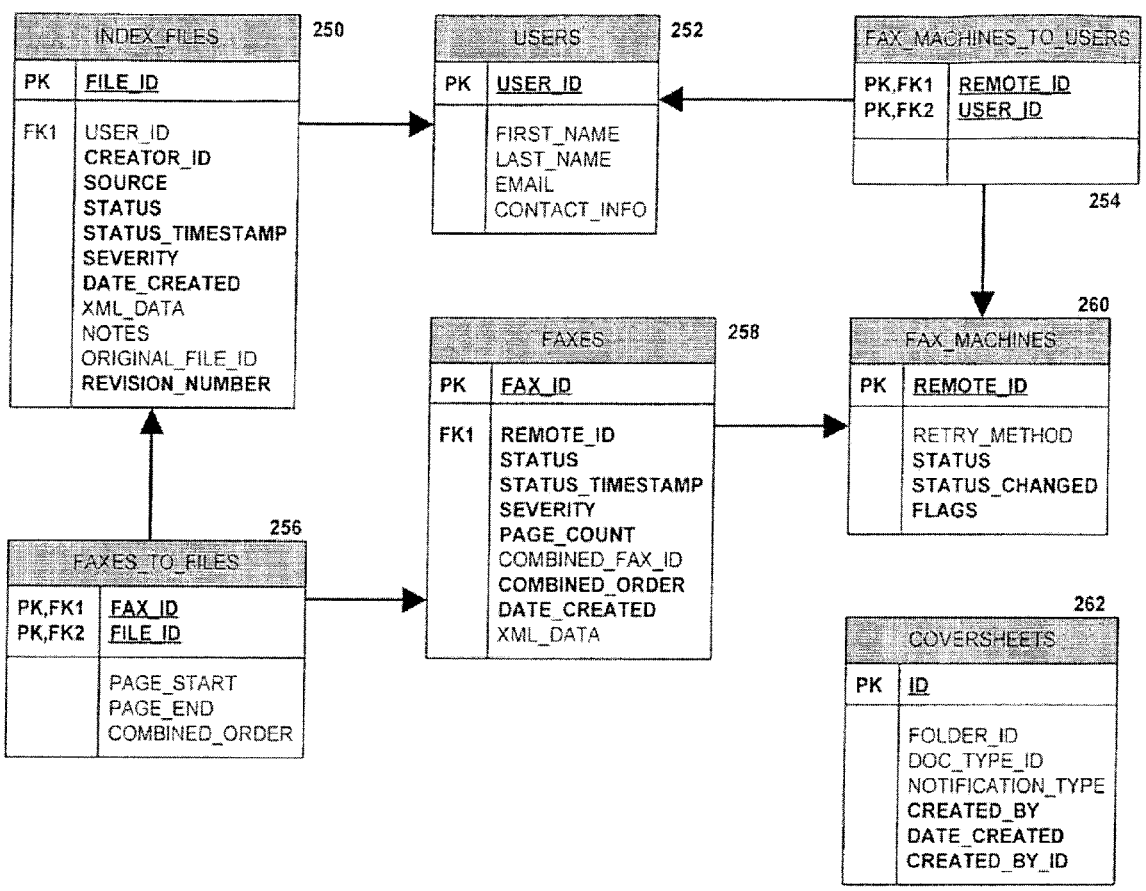

FAX HANDLING SYSTEM AND METHOD

A portion of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

U.S. patent application Ser. No. 10/160,478, filed May 31, 2002 by Michael J. Shutt and entitled "Document Management System and Method," the entire disclosure of which is hereby incorporated herein in its entirety by reference, describes a system and method for electronically managing information in a transaction involving multiple parties who are sharing documents generated in the transaction. The above-mentioned patent application describes one of the means by which a transaction party may upload an image document into the system as being via facsimile or "fax" transmission to the system.

BACKGROUND OF THE INVENTION

The present invention relates generally to systems and methods for transmitting documents via facsimile or "fax" technology.

One of the mechanisms or devices by which a user can introduce documents into the Document Management System and Method in the above-described patent application is a fax machine. As described in that application, a user can generate a barcoded document coversheet that provides information about a document. The coversheet is then placed in front of the associated document, and the aggregate pages are faxed to a repository. Multiple documents can be combined into a single fax provided that the appropriate barcoded coversheet is placed in front of each document. Once received, the system scans the pages of the fax for barcodes, which are then used to separate and identify the individual document(s) contained within the fax, indexing the documents into the appropriate location in the repository.

SUMMARY OF THE INVENTION

The present invention recognizes and addresses the foregoing considerations, and others, of prior art constructions and methods.

This and other objects are achieved in an embodiment of the present invention by a system and method for detecting interruptions that occur during the process of sending images of a set of source pages via facsimile transmission and determining that two separate transmissions are associated with each other. An initial fax transmission is received, and its interruption is automatically determined. The initial transmission is automatically matched with a subsequent transmission.

In another embodiment of the present invention, a method for managing and processing image data received via facsimile transmissions at a central location, wherein problems in the received image data can be identified and corrected, includes monitoring each fax transmission for an interruption. An interruption in an initial fax transmission, whereby only a portion of the image date is received, is detected. Subsequent transmissions are monitored, and image data is compared between the initial transmission and the subsequent transmissions. Image data common to both the initial and subsequent transmissions is identified, and the initial interrupted transmission is associated with the subsequent transmission. Image data from the initial transmission is combined with image data from the associated transmission.

In another embodiment of the present invention, a method for receiving one or more documents transmitted from a user via facsimile transmission which identifies and corrects an error in the document(s) received includes receiving one or more documents via facsimile transmission and identifying the existence of any of a predetermined set of errors in the transmission. The identified errors are corrected through subsequent transmissions and/or manual user intervention in response to a logical set of predetermined options.

The accompanying drawings, which are incorporated in and constitute a part of this specification, illustrate one or more embodiments of the invention and, together with the description, serve to explain the principles of the invention.

BRIEF DESCRIPTION OF THE DRAWINGS

A full and enabling disclosure of the present invention, including the best mode thereof directed to one of ordinary skill in the art, is set forth in the specification, which makes reference to the appended Figures, in which:

FIG. 1 is a diagrammatic view of a document management system for use in an embodiment of the present invention;

FIG. 2 is a diagrammatic view of system components in a document management system for use in an embodiment of the present invention;

FIG. 3 is an exemplary user screen display of a folder view page for use in an embodiment of the present invention;

FIG. 4 is an exemplary user screen display of a fax coversheets generation page for use in an embodiment of the present invention;

FIG. 5 is an exemplary screen display of an example fax coversheet for use in an embodiment of the present invention;

FIG. 6 is an exemplary screen display of an example scanning barcode sheet for use in an embodiment of the present invention;

FIG. 7 is a diagram of a properly ordered scan and fax with barcode coversheets for use in an embodiment of the present invention;

FIG. 8 is a table which describes exemplary barcode attribute values for use in an embodiment of the present invention;

FIG. 9 is a table which describes exemplary barcode template types for use in an embodiment of the present invention;

FIG. 10 is a table which describes exemplary barcode templates for use in an embodiment of the present invention;

FIG. 11 is an exemplary illustration of raster graphics for use in an embodiment of the present invention;

FIG. 12 is an exemplary schematic comparison of two raster bitmap pages for use in an embodiment of the present invention;

FIGS. 13a and 13b are flow charts describing page comparison logic used in an embodiment of the present invention to determine if two pages are identical matches;

FIG. 14 is an exemplary flow diagram illustrating the processing of a received fax for use in an embodiment of the present invention;

FIG. 15 is an exemplary flow diagram supplementing the flow diagram of FIG. 14 to illustrate addition of a new incomplete fax entry for use in an embodiment of the invention;

FIG. 16 is an exemplary flow diagram further supplementing the flow diagram of FIG. 14 to illustrate comparison of a new fax to a pending incomplete fax for use in an embodiment of the present invention;

FIG. 17 is an exemplary diagram supplementing the flow diagram FIG. 16 illustrating combination of a new fax with a matching incomplete fax for use in an embodiment of the present invention;

FIG. 18 is an example of an email notification sent for a fax problem in an embodiment of the present invention;

FIG. 19 is an example of fax problem information screen, in a summary view, for use in an embodiment of the present invention;

FIG. 20 is an example of fax problem information screen, in a details view, for use in an embodiment of the present invention;

FIG. 21 is an example of a screen presenting corrective actions for a fax problem for use in an embodiment of the present invention;

FIG. 22 is an example of a manual edit mode screen for use in an embodiment of the present invention;

FIG. 23 is an illustration of a possible result of a fax machine misfeed; and

FIG. 24 is a diagram showing an exemplary entity relationship for database tables for use in an embodiment of the present invention.

Repeat use of reference characters in the present specification and drawings is intended to represent same or analogous features or elements or the invention.

DETAILED DESCRIPTION OF THE PREFERRED EMBODIMENTS

Reference will now be made in detail to presently preferred embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention cover such modifications and variations as come within the scope of the invention.

One or more embodiments of the invention described below are utilized by the system described in the patent application for a Document Management System and Method first referenced above, herein referred to as the "repository," and provide the ability to submit documents into an electronic repository via a fax transmission. For the purpose of discussion of the present invention, the term "repository" will be used to represent the system for retaining and sharing documents described in the patent application for a Document Management System and Method, while the term "system" will be used to represent the present invention, which consists of methods for adding documents into the "repository." Although the repository and the present invention are used together in the current embodiment, the present invention could be utilized by many other types of systems.

Those of ordinary skill in this art should understand that the examples described below are provided for purposes of illustration only and that the present invention may be embodied in various suitable environments.

As described in the patent above-referenced application, one or more embodiments of the repository operate within a distributed computing environment. A distributed computing environment generally includes multiple memory storage and computing devices located remotely from each other. Execution of program modules may occur at these remote locations as data is transferred among the memory devices and by and between the computing devices over an extended network.

Generally, the repository is described herein as used by remote parties. This does not refer to the parties' physical relationship, but instead indicates that the parties do not have control over the repository. In addition, the parties may be remote from each other, not necessarily indicating spatial separation, but instead indicating that no party has control of another party's data in the repository. Thus, the parties control only their access to data in the repository, not the integrity of the stored data itself.

Communication among such parties may be, for example, through the Internet, which is a global accumulation of computing devices that communicate through an information retrieval system, most commonly the World Wide Web (hereinafter "Web"). It should be understood, however, that an Internet-based repository is merely one example of a suitable construction and execution of the repository. For example, remote parties may also communicate among the parties' individual local or wide area networks through a private network structure.

Certain operations and processes described herein are executed by one or more computers within a distributed computing network. As should be well understood, a computer transforms information in the form of electronic signals input into the computer to a desired output. The input may be provided by a human operator, another computer, or from other external stimuli. To accomplish these functions in one computing environment, a conventional personal computer includes a processor, read-only and random-access memory, a bus system and an input-output system to transfer information within the personal computer and to interact with external devices. The computer's memory includes an operating system and various application programs that run on the operating system. Application programs may be added to memory from external devices, for example through the Internet, and may be run on the operating system from an external device or from a device hosted by the computer, for example a disk drive or CD-ROM drive.

The computer's memory may include an application program for browsing the World Wide Web. The browser, which may reside on a server in a local area network or in a stand-alone computer, establishes communication between a Web server and the computer. In response to receipt of a Uniform Resource Locator ("URL"), the browser establishes a network path to a Web server identified by the URL. Once connected, the computer and the Web server may communicate with each other using the Hypertext Transfer Protocol ("http"). For example, the Web server may transfer Web pages, including text and graphic images, and sound and video files using a standard description language such as Hypertext Markup Language ("html"). The Web page may provide "links" to other files and to other servers. The links may be provided as options to the user so that the user may choose to execute the link, or an application program operated by the computer may execute the link without the user's knowledge. The application program may be hosted by the Web server or by a network driven by the Web server and operated by the user over the Internet through the Web browser. The Web server in such an environment is located at an application service provider ("ASP"), an arrangement that should be well understood by those skilled in this art.

It should be understood that the Web server may dynamically produce Web pages by script execution or may transmit scripts or other programs for execution by the Web browser. It should also be understood that communication between the host and client sites may be effected through html, xml or other suitable data format.

The repository is described herein within the context of mortgage transactions, and specifically, transactions in the wholesale residential mortgage industry. It should be understood, however, that this is provided by way of example only and that the present invention used in managing electronic data items within other types of environments.

Existing home owners and home buyers typically obtain mortgages through direct contact with a lender or through a mortgage broker. Where a broker is used, the broker initially requests that the loan applicant complete loan application documents, which may include federaly standardized forms. The broker also obtains credit report documents, which may include a report of the applicant's credit worthiness and an authorization document signed by the applicant providing the broker permission to obtain applicant's credit information and to provide applicant's credit information to lenders and other parties involved in the mortgage transaction.

Ultimately, the broker attempts to match the home owner or buyer with a wholesale lender. From application documents and credit report documents, a broker may be able to determine which lenders are most likely or best suited to provide a mortgage to the applicant. The various lenders, however, may require somewhat different documentation, and the broker may therefore require varying information and papers from the applicant depending on which lender the broker initially contacts. Typically, however, lenders require income-related documents, for example W-2 forms and pay stubs, and a property appraisal.

The broker provides these documents to the lender who in turn puts together a loan origination package. In the subsequent underwriting process, the lender may additionally generate a variety of forms solely for its internal use. After determining whether it wishes to grant or deny the loan, the lender generates an approval/denial statement. The lender provides a copy of the approval/denial statement to the broker, so that the broker may notify the mortgage applicant. If the loan is approved by the lender, the broker's role is largely complete, and there is therefore little or no document sharing between the broker and other parties as the mortgage transaction proceeds. If, however, the loan is denied by the lender, the broker typically contacts a different lender, repeating the process until a lender is found that will approve the application. It should be noted that any party that reviews the documentation associated with an application is required to maintain copies of those documents for some period of time as required by the applicable regulations. In other words, any lender that reviews an application must keep copies of the application documents regardless of whether that lender ultimately approves the loan. The same requirements apply to a broker, regardless of whether that broker is ultimately able to locate a suitable lender.

Assuming the lender approves the mortgage request, the lender prepares various documents executed between the applicant and the lender at closing of the mortgage.

If the lender maintains the mortgage in-house, the lender continues to manage the mortgage until resolved by the applicant. Often, however, lenders sell loan packages to larger investors such as FREDDIE MAC or FANNIE MAE. Alternatively, a lender may outsource the mortgage to a service provider that handles collection of the home owner's mortgage payments for an agreed-upon fee. In either case, the investor typically requires origination and closing documents from the lender in order to assess the advisability of taking the mortgage. The investor may require the approval/denial statement as part of its origination documents, although it typically is not provided in the lender's internal underwriting documents.

An image or other electronic format of each document is stored in a single repository, which may comprise a single server and database site or multiple servers and/or databases. Both parties to the transaction store documents to, and view documents in, the repository over a remote connection such as the Internet. Once stored in the repository, neither party, even the party that initially created and stored the document, can delete the document from the repository if access to that document is required by another party. Likewise, once a document is added to the repository, it is not possible for any party to revise or replace that document. A revised version can, however, be stored as a new document.

When a party requests a document from the repository, the host server provides a Web page displaying an image (e.g. in PDF format) of that document to the party. Each transaction party may define an organization by which the repository presents the document images to one or more users at the transaction party site. Such an organization is referred to herein as a "view," and each party may organize documents into document types which are in turn organized into document groups. Thus, each party may organize its access to the repository documents into groups that suit its needs. That is, in its view(s), the repository documents to which the party's users have access are organized in a manner suitable to how that party conducts business.

The document organizations defined within a given party's views do not affect the organization of the documents in the repository. Each party's users view the repository documents as if they were grouped according to the party's particular needs. The repository, however, contains only a single document image for each indicated document. That is, the repository contains only a single instance (in an image or other electronic format) of the document shown in each view.

A view may be unique to the transaction party. The broker may organize its view into groups identified as application documents, credit report documents, income documents and other documents. Each group is associated with one or more document types, for example Forms 1008 and credit reports. From the lender's perspective, however, all of these document types relate to loan origination and are therefore grouped in its view under an "origination" group. For its part, the lender categorizes certain other documents as relating to underwriting and closing—groups not applicable to the broker.

A party storing a document into the repository may grant access to that document to any other party, and the repository maps the document images from the source party's view to the receiving party's view. Once a party has been granted access to a document, it may likewise grant access to any other party, regardless of whether the former party initially stored the document in the repository. Accordingly, document access may be established as needed during a transaction's progression, even though the transaction moves beyond the originating party.

Once a party has access to a document in the repository, the party may remove the document from its view, but this does not affect access to that document by the other parties. In one preferred embodiment, no single party controls when a document is deleted from the repository. Thus, "removal" of a document refers to deletion of access to a particular document only from that party's view. After deletion, if the party wishes to re-establish the document within its view, another party currently having access to the document may provide access.

If and when all parties have removed a particular document from their respective views, the document may be purged from the repository.

FIG. 1 illustrates one exemplary environment of the present repository in which remote parties communicate with the repository over the Internet. A host system 10 hosts server-side software at a primary server 2 with which a plurality of client work stations 18 communicate via the Internet. In one embodiment, primary server 2 includes dual 750 MHz PENTIUM III processors, with 2 gigabyte RAM and RAID5 storage. Server 2 stores and manages data through an SQL database 4. Database 4 is separated from server 2 for purposes of illustration, although it should be understood that the database and server can be embodied by the same hardware. The repository may generally be considered to include the SQL server database, document storage and document images. An administrator may communicate with server 2 and database 4 through an administrator workstation 6, for example a personal computer.

Client systems 18 may each include a workstation 12. Workstation 12 may be, for example, a personal computer supporting an Internet browser such as Internet Explorer 5.0, or higher version, available from MICROSOFT CORPORATION. In the presently described embodiment, workstation 12 also supports software for viewing PDF format images, such as an ADOBE ACROBAT reader.

A transaction party may store documents in repository database 4 through its workstation 12. The transaction party may acquire the image through any suitable means, for example via a fax machine 14, a scanner 16 or through uploading an existing electronic document from another storage device.

FIG. 2 illustrates in block diagram form the administrative software housed at primary server 2. For purposes of clarity, only one client workstation 18 is illustrated. Primary server 2 houses client interface software 26, for example written in VISUAL BASIC SCRIPT, that is executed by a MICROSOFT IIS Web Server to generate Web pages that are downloaded to client systems 18 and through which the transaction parties communicate with the host system 10. Working through such Web pages, the transaction parties may request that the host system retrieve a document image stored in the repository. Responsively to such a request, the client interface software 26 executes appropriate queries against database 4. Retrieving the document image, client interface 26 downloads the image to the appropriate client workstation 12 in a Web page through the Internet 20.

As described below, a transaction party may submit a document to the repository in any suitable format, for example an image or other electronic file generated by fax, scan or electronic download. For each document, the transaction party provides a document type and destination folder, although additional information may also be provided. The transaction party may submit the document image in a multi-page TIFF format, optionally using bar codes to provide required information such as the document type and the destination folder. In the case of a scanned image, local software at a client workstation 12 combines data read from bar codes with data provided interactively by the user and sends the scanned TIFF image to the host server along with the data identifying the document type, destination folder, the transaction party, and the date and time. The host server passes the file to an indexing process 22 (which may be written in VISUAL BASIC and C++), which in turn stores the document image in database 4 in association with a document number, an origination date and the folder defined by the originating transaction party and in which the document image will thereafter appear.

In the event a transaction party faxes a document image from a fax machine 14 to fax server 8 through a dial-up connection, the fax is received through a modem connection by a fax server code module. The fax server code is built, for example, from a FAXMAN tool kit available from Data Techniques, Inc. The fax server code communicates the faxed TIFF file directly to the indexing process. Alternatively, a client fax machine 14 may fax the document image to a fax service provider 28. The fax service provider then emails the document image file and its associated data to the host server through Internet 20. The server passes the file to indexing process 22 similarly to scanned images.

In the event a transaction party uploads an image document from a source other than a fax machine 14 or a scanner 16, client workstation 12 transfers the image to the host server over Internet 20 through an http or https connection. The host server then provides the image to indexing process 22.

A single multi-page TIFF file may include multiple documents. In such a file, each document is identified by a separate bar code, which may be printed directly on the first page of the document or may be located on a separate coversheet immediately preceding the first page of the document. Accordingly, indexing process 22, responsively to the information provided by the bar codes, separates the file into individual document images for storage in database 4.

Indexing process 22 stores all documents to the database 4 in PDF format. It should be understood, however, that documents could be stored in various other suitable formats. Upon receiving TIFF files of scanned or faxed images, indexing processor 22 translates the TIFF document images into PDF files. Similarly, if files uploaded from other sources are not in PDF format, indexing process 22 translates such files, provided the indexing process recognizes the format of the received file. File translation processes should be well understood and are, therefore, not described herein.

The user accesses the repository web server using a browser, providing authentication credentials. Once in the repository, the user can either create a new folder or access an existing folder. From a Folder View page, shown in FIG. 3, the user clicks on a faxing link 32 in a navigation bar 34, which takes the user to the fax coversheets generation page, shown in FIG. 4. From that screen, the user checks desired document types 38 and clicks on a submit link 42, which causes the fax coversheets, shown in FIG. 5, to be generated in the browser. At that point, the user simply prints the coversheets from their browser.

Once printed, the coversheets can be used to fax each document to the system for processing and ultimate delivery to the repository. To do this, the user simply places the appropriate coversheet in front of each document to be faxed. In an example is shown for Faxing Barcode Sheets in FIG. 7, a proper fax consists of a Fax Document Coversheet followed by one or more pages of a document, followed by a second Fax Document Coversheet followed by one or more pages of a document, and so on.

In addition to using barcodes sheets for identification of documents, the system enables the user to generate barcode sheets that instruct the system to take a predefined action associated with a folder and/or document in the repository. For example, a user can generate a barcode sheet that instructs the system to send an email notification indicating that a particular folder contains all documents necessary for the business transaction. This type of barcode sheet is referred to as an "action barcode sheet" and is typically included as the last page of a fax containing documents and coversheets. An example of such an action, shown in FIG. 6, is an e-mail notification that the folder is complete.

Coversheet Barcoding Methodology

The barcoded sheets used by the system are designed to be self-describing. To accomplish this, barcodes are generated in sets, herein referred to as "barcode sets." The first barcode in any set, which is referred to as the "header barcode," describes what the other barcodes contain. Preferably, a single page should only contain a single barcode set. Barcode sheets that are associated with one or more following pages are often referred to as "coversheets." In the presently-described embodiment, the system uses a set of barcode set templates to identify information about how indexing data should be generated from the barcodes, as described in more detail below.

Certain types of barcode sets are used in combination. For example, a "batch" coversheet may be used in conjunction with "document separator" coversheets. In this particular embodiment, the batch coversheet defines data elements that apply to all subsequent document separator pages, whereas each document separator coversheet defines data elements that apply only to the document that immediately follows it. When coversheets have interdependencies, such as the batch/document separator coversheets, the template definitions define that the coversheets have a parent-child relationship.

The definition of each barcode template also associates it with one or more value attributes, each of which describes a particular data element contained in the subsequent barcodes. If a particular value attribute contains more characters than can be encoded in one line of barcodes, the template can specify that the value be encoded using multiple barcode lines. In such a case, the individual barcode values are simply concatenated to construct the attribute's value.

Referring to FIG. 8, the presently described embodiment of the system defines eight attributes for which values can be provided in barcodes. Each such attribute is assigned a unique ID. The type of indexing data generated from each attribute is also defined by the system.

Referring to FIG. 9, the presently described embodiment of the system defines five barcode set template types. Each template type is assigned a unique ID. For each template type, the system also defines if it has an expected location, if the template type marks the start of a document span, and if the template type has a parent-child relationship with another template type.

Referring to FIG. 10, the presently described embodiment of the system defines seven barcode set templates based on the template types and attribute values. Each template is assigned a unique ID. For each template, the system defines the template type upon which it is based and provides a user-friendly description that can be printed on a sheet containing the barcode set. The system also enumerates the attribute values that can be contained within each barcode template. For each attribute value available for use in a template, the system defines a template index, whether the attribute is required to be used in the template, and the number of barcodes used to encode the attribute's value.

Some of these templates currently defined by the system may not be used, but are provided for backward compatibility.

By way of example, and referring to the example barcode sheet illustrated in FIG. 5, a header barcode 46 contains the value *610*. The system interprets this header to mean that the barcode sheet uses the template with ID of 6 and contains one other attribute value whose index in the template is 0. From the definition of the template with ID of 6 illustrated in FIG. 10, the system can then determine that the barcode set is based on the template type with an ID of 2. Referring to FIG. 9, the system then can determine a template based on template type 2 does not have an expected location and is used to mark the start of a document span.

Again referring to header barcode 46 in FIG. 5, the system can determine that the barcode set contains a single attribute value whose index in the template is 0. Referring to FIG. 10, the system can determine the attribute value with an index of 0 in the specified template maps to the attribute value with ID of 8 and is encoded using 6 lines of barcodes. Using that information, and referring to FIG. 8, the system can determine that the remaining six barcodes in this page should be concatenated to form a string that contains a coversheet ID and checksum (*ELN11LNTLRHZHMUXS2AS0ONA4B1BZB*).

Referring to FIG. 6, which is an example of a folder complete notification, a header barcode 50 contains the value *5202*. The system interprets this header to mean that the barcode sheet uses the template with ID of 5 and contains two other attribute values whose indexes in the template are 0 and 2, respectively. From the definition of the template with ID of 5 illustrated in FIG. 10, the system can then determine that the barcode set is based on the template type with an ID of 5. Referring to FIG. 9, the system then can determine a template based on template type 5 is expected to occur as the last page of a set and is not used to mark the start of a document span.

Again referring to the header barcode in FIG. 6, the system can determine that the barcode set contains two attribute values, whose indexes in the template are 0 and 2. Referring to FIG. 10, the system can determine the attribute value with index of 0 in the specified template maps to the attribute value with an ID of 1 and is encoded using a single barcode. Likewise, the system can determine the attribute value with an index of 2 in the specified template maps to the attribute value with an ID of 7 and is encoded using a single barcode. Using that information, and referring to FIG. 8, the system can determine that the remaining two barcodes in this page contain values for a Folder ID (*43475*) and notification action ID (*1*).

From a practical standpoint, there is a limit to how much data can be encoded on a single sheet of letter or legal size paper using "3 of 9 barcodes." In order to allow a single coversheet to be associated with more data than can be directly encoded with the barcodes, a coversheet identifier is provided for the value attributes defined by the system. This identifier has a finite length but can be associated with much more data stored in the system's database. When a coversheet is generated using this attribute value, the system stores related information, which may include the ID of the folder to which the document pertains, the type of the document, the type of action to be performed by the system, the ID of the user who is generating the coversheet, and the date and time at which the coversheet was generated. The system then returns a Globally Unique Identifier (GUID) for that coversheet, which is encoded using 3 of 9 barcodes according to the method described below.

The GUID value returned by the system for a coversheet contains 16 bytes (or 128 bits) of data. A single 5-bit value can range from 0 to 31, and thus can be represented by use of 32 unique alphanumeric characters (for example, A=0, B=1, C=2, etc.). Consequently, a 128-bit GUID value can be broken into 26 sequential 5-bit sequences, each represented by a single alphanumeric character. The 3 of 9 barcode scheme can be used to encode 26 uppercase letters, 10 numeric characters, and 7 special characters (or a total of 43 unique characters). Therefore, a GUID represented as a string of 26 alphanumeric characters can then be encoded using the 3 of 9 barcode scheme. Additionally, a set of barcodes using the coversheet ID approach may contain a CRC (cyclical redundancy check) checksum value that corroborates that the barcode has been read correctly by the indexing process. This checksum value is simply appended to the GUID value data before it is translated into barcodes. Use of checksums in this manner is common practice and should be familiar in this art.

Fax Processing Component

Referring again to FIGS. 1 and 2, when the receiving fax device 8 receives the transmitted pages, the fax device saves the contents of the fax into a Tagged Image File Format (TIFF) file and submits the TIFF file to fax processing component 24, a portion of the system which is responsible for monitoring the incoming faxes for interrupted transmissions.

Fax transmissions most commonly use the specifications put forth by the Consultative Committee for International Telegraph and Telephone (CCITT), which is now part of the International Telecommunication Union (ITU). Although there are more recent specifications that allow for transmission of color images, the large majority of faxed images are monochrome or 1-bit images (i.e., only black and white color).

Facsimile transmissions are typically performed using modems and analog telephone lines. In practice, the use of these technologies is somewhat error-prone. Often a fax containing multiple pages cannot be completed in a single transmission because the quality of the analog connection degrades to a point where either the sending or receiving fax machine aborts the transmission.

As fax machine technology has improved, several features have become available in some current models. One of these features is the ability of a fax machine to scan and store pages in memory before they are transmitted. Some fax machine models enable the operator to initiate the transmission one time and will automatically retry without interaction from the operator if there are connection or transmission problems.

Additionally, faxes are commonly sent using modems connected to personnel computers (PCs). This type of system functions in a similar manner to dedicated fax machines, the difference being that a PC-based faxing system converts electronic documents to raster images rather than scanning paper documents.

There are several ways in which the sending fax machine may deal with an interrupted transmission. For example:
1. the fax machine may simply do nothing, and the operator must resend the fax;
2. having stored the entire fax in memory, the fax machine may simply redial the destination number and start over, resending the entire fax;
3. having stored some or all of the remaining pages in memory, the fax machine may redial the destination number and pick up where it left off.

If a transmission is interrupted, typically the last page sent is only partially complete. If the sending fax machine uses the third method described above to retry the transmission, the fax machine resends that page in its entirety as the first page of the second transmission. The sending fax machine may also insert the very first page of the fax into the second transmission as an indicator to the receiver that the second transmission is a continuation of the first.

If an interrupted transmission occurs, the action taken by the system is dependant upon the retry capabilities of the sending fax machine. The system uses the transmitting station identifier (TSID) sent by the sending fax machine to identify the sending fax machine. The capabilities of each fax machine are learned and stored by the system. If it is known that the sending fax machine does not support automatic retries, the system can be configured to automatically submit incomplete faxes from that fax machine to the indexing process.

If it is known that the sending fax machine may support automatic retries and resend the entire document, the incomplete fax is "pended," or stored for some period of time to see if a complete transmission is received or if a subsequent incomplete fax with more complete pages is received. The system leaves an incomplete fax in a pended state for a predefined length of time (one hour in a preferred embodiment) and then submits the incomplete fax for indexing if a more complete fax is not received in that time.

If it is known that the sending fax machine may support automatic retries and that it may attempt to start the retry transmission at the point reached by the first transmission, the initial incomplete fax is "pended" for some period of time in the hopes of matching it to the remaining portion of the fax received during the subsequent "retry" transmission(s). If two or more partial transmissions can be successfully matched, they are combined before being forwarded for further processing.

The system is based on the assumption that if a fax machine does support automatic retries, then it will use page data that is stored in memory. In other words, the fax machine will have scanned the pages into memory and can simply resend those pages without having to scan them again. If this assumption is valid, the page data is identical between transmissions. If the page data is identical across transmissions, it is possible to match, with a high degree of certainty, a partial or complete page sent as part of one transmission to the same page sent in its entirety as part of another transmission.

Fax transmissions utilize raster graphics to represent the page images. Referring to FIG. 11, raster graphics describe an image using a bitmap, which is simply a two-dimensional grid that divides the image into very small pieces. When a raster image is rendered (either for display or printing), the bitmap is simply scaled to the appropriate size for output. In a monochrome (black and white) bitmap, the color of each piece of the grid can be represented by a single bit (zero or one value). As is well known in the art, a bitmap is typically stored in memory as a stream of bits, arranged in such a way that the stream can be separated into rows and columns to form the two-dimensional grid.

Each page of a fax is transmitted as a series of individual rows of the bitmap representation. As rows are transmitted, the receiving fax machine may detect errors in the data. If errors are detected, the receiver can notify the sender that the affected rows should be retransmitted. If the sender is capable of operating in Error Correction Mode (ECM), the affected data is retransmitted as necessary. However, if the sender does not support ECM, the receiver of the fax may be forced to store invalid data, which is typically reported as bad lines in the fax page.

Keeping in mind that a transmitted page may contain arbitrary bad lines, it is possible to receive multiple transmissions of the same page data that contain subtle differences. However, it is likely that each transmitted page contains unaffected portions of the original bitmap and that each transmission contains unaffected portions of the bitmap that are common to the other transmissions. Thus, in such a scenario, it is still possible to identify that the transmissions represent the same page.

Matching of Interrupted Fax Transmissions

One common method of comparing two streams of binary data is to compute checksums for each stream. Checksums are computed using algorithms that, with a high degree of certainty, return the same value only if the two streams are the exact same size and contain the exact same data. Therefore, if the checksums computed from two binary streams are not equal, there is a very high likelihood that the streams are different. Conversely, if the checksums computed from two binary streams are equal, there is a very high likelihood that the streams are identical.

Referring to FIG. 12, when the system is called upon to compare two pages to determine if they are transmissions of the same source page, typically the first transmission is only partially complete, as is often the case when a transmission is interrupted. In this situation, the system compares the portion of the first transmission that was received against the corresponding portion of the second transmission. It should be noted that the same logic can be applied to comparing two pages that are both complete.

In FIG. 12, a bottom offset 60 represents the portion of a faxed page that may be appended to the source page data by the sending fax machine. An uncompared area 62 represents the portion of the page data that was not received in the first transmission if it was interrupted. If the transmission of both pages is complete, there is no uncompared area. A header offset 64 represents a section of the transmitted data that is pre-pended to the source page data by the sending fax machine and contains various things, typically including a date and time at which the page transmission was begun. The remaining portions of each page, indicated by locator rows 66 and section 1 through Section 5 (66*a-e*, respectively), represent the image data that is used to compare the pages.

Referring to FIG. 12 and FIGS. 13*a* and 13*b*, the logic for comparing two pages makes several assumptions. First, the two pages being compared have the same width (in terms of pixels). Second, if either page is incomplete (due to an interrupted transmission), the least complete page (or the one with the fewest number of valid rows) is examined first.

As the first page is examined, the first task is to determine the row at which to begin processing. This is based upon whether the page is complete at 70. If the page is known to be complete, the starting row is set to the bottom of the page, or the last row of image data, at 72*a*. If the page is known to be incomplete, or if it is unknown whether the page is complete, the starting row is determined by evaluating each row of the image data from the top to the bottom. If a row is found to contain invalid image data, the previous row is judged to be the last row of valid image data, and is selected as the starting point at 72*b*. If no rows are found to be invalid, the last row of the image is selected as the starting point.

The starting point is then moved up at 74 an arbitrary number of rows to bottom offset 60 to account for the possibility that (a) the sending fax machine may have appended additional data to the bottom of the source page or (b) that some of the last rows transmitted in a interrupted transmission are likely to contain bogus data as the quality of the connection was degraded just prior to the interruption. In the present embodiment, the number of rows in bottom offset 60 is equivalent to 0.5 inches, which is 50 rows for an image with a vertical resolution of 100 dots per inch (DPI).

Once the starting row has been determined, the next task 76 is to find a set of locator rows 66. Moving upward from the starting row, a checksum is calculated on the image data contained in each individual row. When three consecutive rows are found to have different checksums, their locations and checksum values are stored.

Once the locator rows have been found, the remaining rows of image data minus the rows contained in header offset 64 are characterized. If, at 78, the image data is known to contain bad lines, the remaining rows are first separated at 80*a* into uniform sections, each section containing an arbitrary but equal number of rows. In the present embodiment, this arbitrary value is fifty rows. The last section may contain fewer rows if the total number of rows is not evenly divisible by the number of rows defined for a section. If the image data does not contain bad lines at 78, the remaining rows are grouped into a single section at 80*b*. Each section is then characterized by recording the height of the section, and a checksum is calculated on the image data contained in the section 82.

As the second page is compared to the first page, the first task 84 is to move the starting row position to the first row that was part of the locator rows from the first page. From there, the starting row position is moved at 86 down the number of rows defined for the bottom offset. This is done to take into account the possibility that the number of rows prepended to the source page may vary between transmissions.

From this starting point, and moving upwards, the next task 88 is to attempt to locate the first set of three rows that have matching checksums to the locator rows 66 recorded in the first page. If three such rows cannot be found, the pages are deemed to be different. If three such rows can be found, the system determines at 90 if there are enough remaining rows to define sections matching the sections recorded in the first page. If there are not enough remaining rows, the pages are deemed to be different, illustrated at 98.

If there are enough remaining rows, the rows are separated into sections using the same dimensions used in the first page, and the checksums for each section in the first page are compared against the corresponding section in the second page, at 92. If there is at least one section in both pages that contains at least one black pixel and that has matching checksums between the first and second pages, the pages are deemed to be the same at 96.

When possible, fax processing component 24 (FIG. 2) combines the multiple transmissions of a fragmented fax into a single TIFF file. The fax processing component is also responsible for monitoring other types of problems, such as suspicious page dimensions, which may indicate a misfeed at the sending fax machine, or for invalid TIFF data that may be received due to poor connectivity during the transmission.

Management and Processing of Incoming Faxes

The following discussion makes reference to database tables which are illustrated in FIG. 24. A more detailed discussion of that figure and the database tables is presented below.

Referring to FIG. 14, a fax may be received at 102 from one or more sources. Those sources may provide varying levels of information regarding the fax to the fax processing component. The fax source may be able to indicate if it is known that the transmission was interrupted or was completed successfully. Alternatively, if the fax source does not provide this information, a determination of whether or not the last page of the fax is incomplete can be made at 104 by the fax processor. The fax processor examines the TIF data of the last page for invalid data (such as invalid Huffman codes) to determine if the image data contained in the last page is complete. If the image data on the last page is not complete, the fax processor assumes that the fax transmission was interrupted.

If the fax is determined to have been interrupted, the transmitting station identifier (TSID), otherwise known as a remote ID, which is transmitted by a sending fax machine and in most cases is the phone number of the fax machine sending the message, is compared against a database of known fax machines at 106*a*. If the remote ID cannot be found in the database, a new entry is created at 108*a* which associates the remote ID as an unknown fax machine type (meaning the retry method of the fax machine is unknown). A new entry is then added to the incomplete fax information store at 110*a*. Additional details for adding a new incomplete fax entry are contained in the description of FIG. 15, below. After the new incomplete information is stored, a new entry is added to the FAXES table at 114b with the status of the fax set as "pending".

If a match was found for the fax machine based on its remote ID at 106a, the fax machine retry type is identified from the database at 112a. If a fax machine did not include a remote ID with the fax transmission, a default "anonymous" fax machine type is used. This "anonymous" fax machine is included as a separate entry in the fax machine's database and reports the fax machine as an unknown retry type.

If the fax machine does not support retries (the fax machine type is set to "non-retry" in the database), a new entry is added for the fax to the database at 114a.

After the fax entry has been added to the FAXES table, at 116 the last page of the fax is conditionally trimmed off, an e-mail is conditionally sent, and the fax is conditionally submitted to "indexing," a process described in greater detail below. The fax processor can be configured to either keep a partial page with incomplete data or to trim off the incomplete page before submitting to indexing. The fax processor determines if the last page needs to be trimmed based on this conditional flag and based on whether the last page was found to have incomplete data at 104. In the presently described embodiment the fax processor is configured to automatically trim off the last page of the fax, to not send an e-mail message, and to automatically submit the fax to "indexing."

The fax processor can be configured to automatically "pause," or delay submission to indexing for incomplete faxes, or to automatically submit the fax to indexing. If a fax is paused, an e-mail message is generated to the configured users stating that a fax has been postponed so that the users can manually determine if the fax should be submitted to indexing. If a fax is paused the status of the fax in the FAXES table is set to "incomplete postponed"; otherwise if the fax is submitted the status is set to "incomplete submitted." The fax processor can also be configured to automatically send an e-mail message when an incomplete fax is submitted to indexing. In the presently described embodiment the fax processor is configured to submit the fax to indexing and to not send an e-mail message that the incomplete fax was submitted.

If the fax machine does support retries or is of an unknown retry type at 112a, the fax is compared with the currently pending incompletes at 118a. FIG. 16 provides more details on comparing the current fax with incompletes. Using the results from the comparison at 118a, the fax processor determines the appropriate actions based on whether or not the current fax matches a pending fax at 120a. If the fax does match pending faxes, the fax has completed processing at 124 and requires no further action. If the fax does not match any pending faxes a new incomplete fax entry is added to the incomplete fax information store at 110b. A further description of adding a new incomplete fax entry is contained in the description of FIG. 15, below. After the new incomplete information is stored, a new entry is added to the FAXES table at 114b with the status of the fax set as "pending".

If the fax transmission is determined to be complete at 104, the remote ID is compared with the FAX_MACHINES table at 106b to determine if the fax machine has previously submitted documents. If the fax machine has a valid remote ID but has never sent faxes to the system before, a new entry is added to the FAX_MACHINES table at 108b for the remote ID, and the fax information is added to the FAXES table 114c. The fax does not need to be compared with pending incompletes since this is the first time the fax machine has sent a fax to the fax processor, and therefore a previous fax could not have come from the same machine. After the fax information is added to the FAXES table, the fax is submitted to indexing at 126.

If the remote ID for the fax machine was found in the database at 106b, the retry method of the fax machine is checked at 112b. If the fax machine does not support retries, the fax information is added to the FAXES table at 114c and submitted to indexing at 126. If the fax machine does support retries (or is of an unknown retry method) the fax is compared with pending incompletes at 118b. FIG. 16 provides more information on the process of comparing two faxes.

The result of the comparison with pending incompletes is checked at 120b, and if no matches were found, a new entry is added to the FAXES table for the fax at 114c, and the fax is submitted to indexing at 126. If the fax matches pending incomplete items, the result of the match is checked at 122 to determine if the fax was combined successfully or if the fax was a replacement of the previous incomplete fax such as may occur when the fax machine resends the entire fax instead of starting over at the first incomplete page. If the current fax was a replacement the fax is added to the FAXES table at 114c and submitted to indexing at 126.

If the current fax was combined with pending incompletes, a new entry is added to the FAXES table at 114d, the composite file is conditionally submitted to indexing, and an e-mail message is conditionally sent at 128. The fax processor can be configured to automatically submit composite files to indexing, or it can be configured to "pause" the composite files. If a composite file is "paused," the status of the fax in the FAXES table is set to "complete postponed," and an e-mail message is sent to the configured user(s). If the composite file is submitted to indexing, the status is set to "submitted." If the composite file is submitted to indexing, the fax processor can be configured to automatically send e-mail messages when a successfully combined document is submitted. In the present embodiment, the fax processor is configured to submit the combined fax to indexing and to not send an e-mail message at the successful combination of faxes.

FIG. 15 illustrates how a new incomplete fax entry is added to the incomplete faxes data store which makes up the details of 110a and 110b of FIG. 14. First, the retry type of the fax machine is checked at 132. If the retry type is unknown then checksums are collected for the first, second, and last pages of the fax at 134. FIG. 13a above provides more information regarding collecting page checksums, at 70 through 82. It the fax machine retry type is known, the fax processor checks the type at 136 to determine if the fax machine resends the first page on retries. The retry types of "first-page" and "whole fax" both resend the first page of the fax on retries. If the fax machine does resend the first page, then the fax processor only needs to gather the checksums from the first page for comparison at 138. However, if the retry type does not resend the first page ("last page" retry fax machines), the fax processor only needs to store the checksums from the last page of the fax, at 140.

A copy of the fax is made after the checksums for the fax have been calculated. If the last page of the fax contained invalid data at 104, the last page of the fax is removed from the copy. This copy is now considered the "composite file" which is used to combine matching faxes while keeping the original faxes for auditing purposes. After the composite file is successfully created the checksums are stored in either a database or an XML data store, along with information about the composite file, at 142.

FIG. 16 illustrates the methods for comparing a new fax to pending incomplete faxes. Using the remote ID of the new fax, the data about pending incomplete faxes is searched at 146 for pending faxes with the same remote ID. If there are not any matching pending faxes, a value of false is returned at 164a. If pending incompletes with a matching remote ID are found, the fax processor begins looping through those incompletes searching for a match at 148.

At 150, if the fax machine has been optimized for fax processing by having a retry type, then only the first or last page of the fax need to be compared. If the retry type has been set, the system determines at 152 whether the fax retry type is "whole fax" or "first-page." If the retry type is of a type that resends the first page, the system determines at 156 whether the checksums between the first page of the new fax and the first page of the pending fax match. FIG. 13b provides additional information regarding performance of checksum comparisons, at 84 through 98. If the checksums of the first pages do not match, the fax processor continues looping through the pending incompletes at 148. If the checksums of the first pages match, the fax processor updates the incomplete entry information at 166 and returns true at 168. FIG. 17 provides further information regarding how the incomplete entry is updated.

If the fax machine retry type does not resend the first page of the fax, a comparison of the checksums between the last page of the composite fax and the first page of the new fax is performed at 154. If the checksums of the two pages do not match, the fax processor continues looping through the pending incompletes at 148. If the checksums of the pages do match, the fax processor updates the incomplete entry information at 166 and returns true at 168.

If at 150 the fax machine has not been optimized for fax processing or if the fax retry type is unknown, the checksums of the first page of the composite fax and the first page of the new fax are compared at 158. If the two pages do not match, the last page of the composite fax is compared with the first page of the new fax at 160. If the checksums of the pages do not match, the fax processor continues looping through the pending incompletes at 148. Otherwise, if the checksums of the composite last page and new first page do match, the fax machine's retry type is updated in the FAX_MACHINES table at 172 unless the fax machine has a flag set to not optimize based on retry type (note that in the present embodiment all fax machines are set by default to optimize based on fax machine retry type). The fax processor then updates the incomplete entry information at 166 and returns true at 168.

If the checksums of the first pages match at 158, the second page of the new fax is compared with the second page of the composite fax at 170. This check determines whether or not the fax was resent with only the first page and then a continuation of the fax, or if the fax was resent in its entirety. The fax machine's retry type is then updated in the FAX_MACHINES table at 172 unless the fax machine has a flag set to not optimize based on retry type. The fax processor then updates the incomplete entry information at 166 and returns true at 168.

If the fax processor loops from 148 to 162 through all pending incompletes that match the current remote ID without finding a matching incomplete fax, the process returns false at 164b.

FIG. 17 illustrates the methods for combining two faxes and updating the pending incomplete information for the fax machine. Based on the retry type determined in FIG. 16 at 166, the fax processor determines at 176 whether the fax machine resent the whole file or just a portion of the file. If the fax machine resent the whole file, a comparison between the number of pages of the composite fax and the new fax is performed at 178. If the new fax has more pages than the pending fax, or if the new fax was complete 104 (FIG. 14), the current composite file is replaced with the new fax, the status of the pending fax is updated to "replaced" in the FAXES table at 180 and processing continues at 184. If the new fax has fewer pages than the pending fax, the current composite file is kept, and the status of the new fax is set to "redundant" in the FAXES table at 182. The date/time stamp of the incomplete information is updated at 186 to prevent the pending fax from being purged too early.

If the sending fax machine did not resend the whole fax at 176, but did resend the first page of the fax at 188, the fax processor checks at 190 to see if the last page of the new fax contains invalid data. If the last page did not contain invalid data, all of the pages from the second page to the end of the new fax are appended to the composite file at 192. If the last page did contain invalid data, all of the pages from the second page to the next to the last page of the new fax are appended to the composite file at 194. After the composite file has been updated, the information about the composite file is updated in the incomplete faxes data store at 196, the status of the pending fax is updated to "combined" in the FAXES table at 198, and the date/time stamp of the incomplete information is updated at 186.

If the fax machine did not resend the first page of the fax at 188, then it must have resent the fax starting with the last page of the previous incomplete fax. The fax processor then checks at 200 to determine if the last page of the new fax contains invalid data. If the last page does not contain invalid data then all of the pages of the new fax are appended to the composite file at 202. Otherwise, if the last page does contain invalid data, all of the pages excluding the last page are appended to the composite file at 204. If the new fax was also an incomplete fax at 104 (FIG. 14), the checksums of the last page of the new fax are computed, and the incomplete information for the composite file is updated with the new checksum values at 206. The information about the composite file is then updated in the incomplete faxes data store at 196, the status of the pending fax is updated to "combined" in the FAXES table at 198, and the date/time stamp of the incomplete information is updated at 186.

At an arbitrary time interval (five minutes in the present embodiment) the fax processor checks for all faxes that were marked as "pending" but that have been marked as "pending" for a specified length of time (one hour in the present embodiment). If configured to submit incomplete items, the fax processor submits all "pending" items that have expired and conditionally send an e-mail stating that the incomplete fax was submitted. If not configured to submit the incomplete items, the fax processor marks the expired items as "incomplete postponed" and sends an e-mail to the appropriate administrator. The present embodiment is configured to automatically submit the incomplete faxes when they expire and to not send e-mail messages.

Indexing Process

The indexing process is responsible for processing a TIFF file and inserting the documents it contains into the repository. Each page in the TIFF file is scanned for the existence of barcodes. As described in "Coversheet Barcode Methodology", the barcodes are used to identify individual documents and notifications. Technology for reading barcodes from a bitmap is widely available and should be understood in this art.

Applying the same template information that is used to generate the barcodes, the raw barcode data is used to derive information necessary to process individual documents and notifications. If the barcode data returns a coversheet id (such as from barcode templates 6 & 7 in FIG. 10), the indexing process queries the database for related information about the document or action.

In the present embodiment, each page of a fax that does not contain a system-generated barcode sheet is considered to be part of a document. Document spans are contiguous pages in a file that do not contain system-generated barcode sheets. System-generated barcode sheets are used to provide information about the document spans that follow the barcode sheets.

Span marking barcode sheets (i.e., document separator sheets) indicate the start of a document span and contain information related to the document span immediately following them. Non-span marking barcode sheets may contain information that is not related to a document span (i.e., a folder complete notification) or may contain information that applies to one or more document spans that occur after them in the file (i.e., a scanning batch coversheet).

Generally, the coversheets in a file should provide indexing information for all document spans. This information typically indicates the destination of the document in the repository and the document's type.

The indexing process analyzes the raw barcode data to detect, when possible, transmission errors and user errors. The following is a discussion of the problems that are detected by the fax processing and indexing processes in the presently described embodiment and how the problems affect the processing of a fax.

All problems are categorized as either warnings or errors. Warnings are problems that likely did not have an adverse effect on the processing of a fax, whereas errors are problems that likely did have an adverse affect on the processing of a fax, possibly causing part the fax to not be processed.

A. Problem Descriptions i. Invalid Header Barcodes

This problem occurs when the topmost barcode (or bottom most barcode if a page was faxed upside down) detected on a page does not appear to be a valid repository header barcode. This problem may occur when a page is not a repository barcode sheet but still contains at least one detectable barcode. It may also be caused by a repository barcode sheet that cannot be read correctly due to poor image quality. This problem is considered to be a warning.

ii. Invalid Barcode Set

This problem occurs when the topmost barcode detected on a page does appear to be a valid repository header barcode, but the number of other barcodes detected does not match the information read from the header. This problem typically indicates that one or more other barcodes can not be detected due to poor image quality. This problem is considered to be an error.

iii. Invalid Barcode Data

This problem occurs when a set of repository barcodes are detected on a page, but one of the barcodes containing an attribute value cannot be interpreted correctly (i.e., as the correct data type). This typically indicates that the barcode is not being correctly read due to poor image quality. This problem is considered to be an error.

iv. Missing Parent Coversheet

This problem occurs when a coversheet that is the child in a parent-child relationship is detected in a file that does not also contain a preceding coversheet that is the parent of the relationship. This problem is considered to be an error.

v. Missing Child Coversheet

This problem occurs when a coversheet that is a parent in a parent-child relationship is detected in a multi-page file that does not contain a subsequent coversheet that is a child of the relationship. This problem is considered to be a warning.

vi. Unexpected Barcode Sheet Location

This problem occurs when a barcode sheet is detected at a location in a multi-page file that is not consistent with the coversheet's use. For example, a batch coversheet is only expected to occur as the first page of a file, whereas a folder complete notification sheet is expected to occur as the last page of a file. This problem is considered to be a warning.

vii. Interrupted Document Span

This problem occurs when a non-span marking coversheet is located somewhere in the middle of an apparent document span, which means that the span was interrupted. Non-span marking coversheets should only occur at the beginning or end of a file, or immediately preceding a span-marking coversheet. This problem is considered to be an error.

viii. Missing Document Span Coversheet

This problem occurs when there are non-barcode sheet pages in a file that are not preceded by a span marking coversheet, which means that there is a document that cannot be classified. This problem is considered to be an error.

ix. Orphaned Document Span Coversheet

This problem occurs when a span-marking coversheet is not followed by at least one non-barcode sheet, meaning that it is not associated with a document. This problem is considered to be a warning.

x. Mixed Coversheets

This problem occurs when scanning coversheets and detected in a file that also contains faxing coversheets, which is not typical. This problem is considered to be a warning.

xi. Page Bad Lines

This problem occurs when a page in a faxed file was transmitted with at least one row containing invalid image data. This problem is considered to be a warning if the page is also identified as a system-generated barcode sheet. If it is not a barcode sheet, it is considered to be warning unless the number of bad lines exceeds a configured threshold of percentage of total rows, in which case it is considered to be an error.

xii. Invalid Page Height

This problem occurs when a page does not have normal dimensions. For example, the page may be shorter than expected or, more commonly, longer than expected. This may indicate that the sending fax machine had misfeed problems (FIG. 23 provides an illustration of a misfeed). This problem is considered to be an error if the page is also identified as a system-generated barcode sheet. If it is not a barcode sheet, it is considered to be warning unless the height of the page is outside a configured threshold, in which case it is considered to be an error.

B. Analysis of Problems

If at least one barcode is detected on a page, the system first verifies that it appears to a valid header barcode. To be considered a valid header barcode, a barcode must contain at least three characters. The first character must indicate a valid template ID. The second character must be a valid number, and the number of remaining characters indicating attribute values must be consistent with the number of barcodes indicated by the second character. If it does not appear to be a valid header barcode, the system reports an Invalid Header Barcode problem.

Assuming the first barcode on a page appears to contain a valid header barcode, the system examines the remaining barcodes. It next checks that the number of remaining barcodes is consistent with the information provided in the header. If the number of barcodes is not consistent, the system reports an Invalid Barcode Set problem and pauses processing of the document spans immediately preceding and following the barcode sheet, if each exists.

Assuming the barcode set on the page appears to be valid; the remaining barcodes are read and interpreted according to the template definition indicated in the header. If any of the barcode values cannot be interpreted correctly as the expected data type, the system reports an Invalid Barcode Data problem and pauses processing of the document span immediately following the barcode sheet, if one exists.

Once the system has read and interpreted all barcodes sheets, it next confirms that the indexing data generated from the barcode sheets is logical with respect to processing of document spans. If the first document span in the file is not preceded immediately by a span marking barcode sheet, the system reports a Missing Document Span Coversheet problem. If a document span other than the first one is not preceded immediately by a span marking barcode sheet, the system reports an Interrupted Document Span problem. If a span-marking coversheet is not followed immediately by a document span, an Orphaned Document Span Coversheet problem is reported.

The system also confirms that parent-child relationships are honored by all barcode sheets. Therefore, if any barcode sheet that is the child of a parent-child relationship is found in a file, the system verifies that a barcode sheet that is the parent of the relationship occurs before the first child barcode sheet. If one does not occur, the system reports a Missing Parent Coversheet problem. Conversely, if a barcode sheet that is the parent of a parent-child relationship is detected, the system verifies that at least one barcode sheet that is the child of the relationship is found following the parent barcode sheet. If such a barcode sheet cannot be found, the system reports a Missing Child Coversheet problem.

The system may also report problems for pages that the system knows to contain bad lines. If a page contains bad lines but also contains a barcode sheet, the system does not report an error because the page is not included in any document. However, if a page that contains bad lines is part of a document span, the system reports a Page Bad Lines problem. If the number of bad lines exceeds a configured threshold (in the present embodiment, five percent of the total number of lines in the page), the system reports the problem as an error. Otherwise, the system reports the problem as a warning.

The system may also report problems for pages that are not of normal dimensions. If a page is shorter than normal, the system reports an Invalid Page Height problem, unless the page also contains a valid barcode sheet, in which case the problem is ignored since the page is not part of a document. If the page is shorter than a configured threshold (two inches in the present embodiment), the system reports the problem as an error. Otherwise, the problem is reported as a warning.

Likewise, if a page is taller than normal, the system also reports an Invalid Page Height problem. If the page contains a valid barcode set, the system reports the problem as an error because there is a possibility that the file page actually contains two pages of the original document, which were transmitted as a single page due to misfeed problems, as illustrated in FIG. 23. Also, if the height is more than a configured threshold (twenty-two inches in the present embodiment), the system reports the problem as an error. Otherwise, the problem is reported as a warning.

For any problem that prevents the successful indexing of a document span within a file, the system, depending on its configuration, also pauses processing of any notifications contained in the fax until a user or administrator corrects the problem.

C. Notification and Correction of Problems

For all problems, the system notifies designated users and/or the system administrator that a problem has occurred. An example of such a notification is illustrated in FIG. 18. Within the notification, the user is provided with information 210 describing when the fax was received and the remote ID 212 of the fax machine from which it was received. Also, within the notification, the user is provided with a hyperlink 214 which can be used to open a fax problem information screen from the system.

Figure 19:
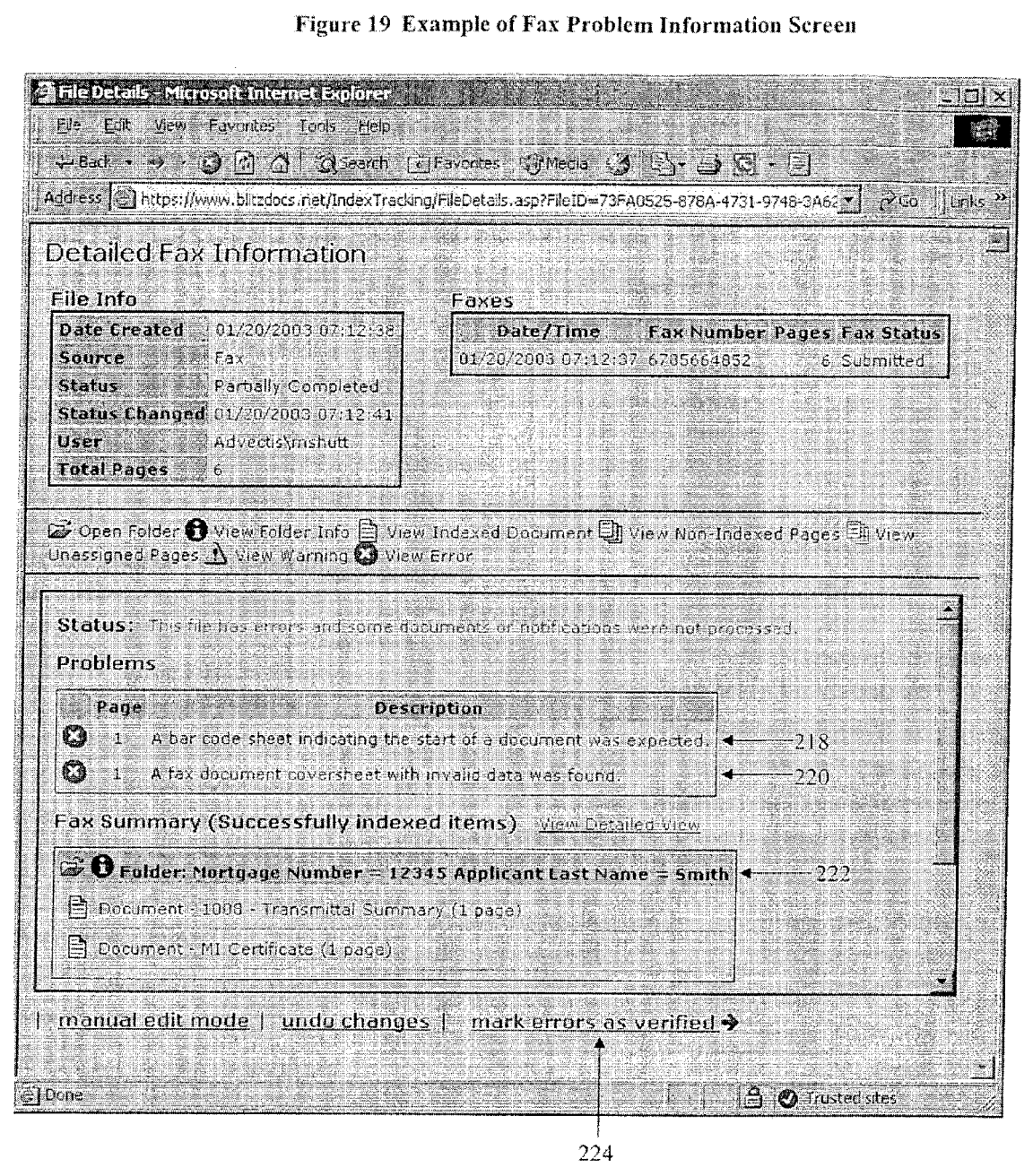
Figure 20:
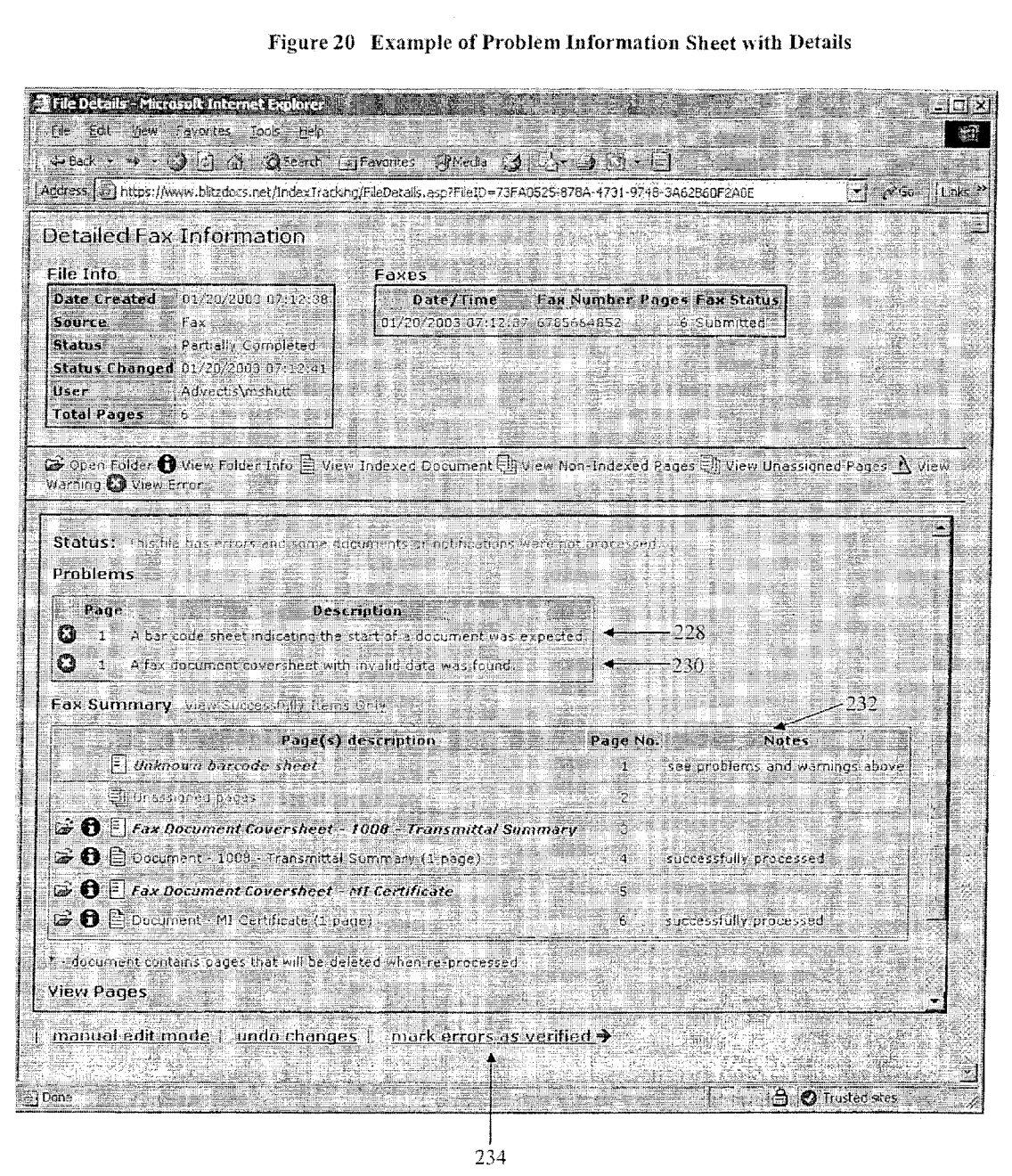

FIG. 19 and FIG. 20 illustrate a fax problem information screen from an example fax. For the purpose of this discussion, within the example fax, the first barcode sheet was deliberately changed so that one of the barcodes was not readable. As such, the system has detected that the first page of the fax was likely a valid barcode set but that it was not readable. This scenario precipitated two errors, Invalid Barcode Set and Missing Document Span Coversheet, which are both presented to the user in the problem summary areas 218 & 220 in FIG. 19 and 228 & 230 in FIG. 20. Additionally, in FIG. 19, the user is presented with a summary 222 of the pages that were unaffected by the problems and were successfully processed. In FIG. 20, the user is presented with a detailed summary 232 of all pages received in the fax. If so desired, the user may indicate to the system that the user will not take corrective action on the problems by clicking on a link 224 in FIG. 19 or a link 234 in FIG. 20.

If the user wishes to correct one of the problems in the fax, the user clicks on the icon next to the problem description. For example, if the user clicks on the image link 220 in FIG. 19, the system presents a screen similar to the one illustrated in FIG. 21. In this screen, the system presents the user with a set of options as described in more detail below. Within the set of options, some may be corrective actions, depending on the type of problem. From this screen, the user can view the problem page by clicking a link 238. Once the user has determined which corrective action is appropriate, the user simply selects an option 240 and clicks on link 242 to apply the selected action.

In general, if the problem is reported as a warning, the user is simply prompted to confirm that the user has acknowledged the problem exists. The user is not presented with any pre-defined corrective actions. If the user determines that the problem does indicate that the file was not transmitted or processed correctly, the user can choose to send the fax again or to enter manual edit mode, an example of which is provided in FIG. 22. From this screen, the user can create a new set of indexing information in an ad hoc fashion using an existing file.

For any problem, the user is given an option to ignore the problem, which has the same effect as the user not responding to the problem notification. In this case, any portions of the file that were put on hold by the system will not be completed.

If the problem is an error and relates to a barcode sheet whose data cannot be accurately read by the system, including Invalid Barcode Set and Invalid Barcode Data problems, the user is given a choice of two corrective actions. The user can indicate that (A) the page does not contain a system-generated barcode set, as might be the case if the page contains barcodes from another system, or (B) the page does contain a system-generated barcode which cannot be read and interpreted correctly, as might be the case if the image quality is poor. If the user selects option A, the system disregards the barcode data from the problem page, reanalyzes the affected portions of the file, and continues processing. If the user selects option B, the user is prompted by the system to manually provide the information that was initially encoded in the barcodes. The system then reanalyzes the affected portions of the file including the barcode information manually provided by the user and continues processing.

For a Missing Parent Coversheet problem, users are given a choice of two predefined corrective actions. The user can indicate that (A) the page(s) which do not have an associated parent coversheet are not system-generated barcode sheets, or the user can indicate that (B) the Parent Coversheet is missing or could not be correctly read. If the user selects option A, the system disregards the barcode data from the problem page(s), reanalyzes the affected portions of the file, and continues processing. If the user selects option B, the user is prompted by the system to manually provide the information that was initially supposed to be contained in the missing or unreadable barcode sheet. The system then reanalyzes the affected portions of the file including the barcode information manually provided by the user and continues processing.

For an Interrupted Span problem, the user is presented with three predefined corrective actions. The user can choose to indicate that (A) the barcode page should be discarded from the file, (B) the barcode page should be moved to a different location in the file, or (C) that a span-marking coversheet is missing from the file at the page immediately following the problem page. If the user selects option A, the system removes the problem page from the file, combining the document spans occurring immediately before and after the page, reanalyzes the affected portions of the file, and continues processing. If the user selects option B, the system prompts the user to supply the location to which the barcode sheet is to be moved. The system then moves the problem page to the designated location, reanalyzes the affected portions of the file, and continues processing. If the user selects option C, the user is prompted by the system to manually provide the information that was supposed to be encoded in the missing barcode page. The system then reanalyzes the affected portions of the file including the barcode information manually provided by the user and continues processing.

For a Missing Span Coversheet problem, the user is presented with two predefined corrective actions. The user can choose to indicate that (A) the file contains only a portion of the original faxed pages, which may be the case if the file is part of a transmission that was interrupted but could not be automatically combined with the other transmissions or that (B) a span-marking barcode page is missing. If the user selects option A, the system prompts the user to select other files, or portions of other files, with which the current file should be combined in order to assemble a complete fax. The system then combines the selected files or file portions and submits the new composite file for indexing. If the user selects option B, the user is prompted by the system to manually provide the information that was supposed to be encoded in the missing barcode page. The system then reanalyzes the affected portions of the file including the barcode information manually provided by the user and continues processing.

For a Page Bad Lines problem that is reported as an error, the user is given one corrective action. The user can indicate that although the page contains a significant number of bad lines, it is still legible and should not prevent the document span from being processed.

For a Page Bad Height problem that is reported as an error, the user is presented with several corrective actions, which vary depending on whether the page also contains a system-generated barcode set. Typically, if the page does not contain a system generated barcode set, the user can indicate that although the page's dimensions are not within normal boundaries, it is still legible and should not prevent the document span from being processed.

As noted previously, a page that is taller than normal may indicate that the sending fax machine experienced a misfeed and several source pages may have been scanned and transmitted together as a single page. Also noted previously, barcode pages are not typically included in any of the documents produced by the indexing process, as they are only used to collect information about those documents. Keeping those two things in mind, if a page contains a valid barcode set but is taller than normal, there is some likelihood that it also contains some image data (i.e., a page) from the source pages that were intended to be part of a document span. If this is true, then the document span is not processed correctly since part of the span is discarded along with the barcode page.

In such a situation, the user is presented with several corrective actions. The user may indicate that (A) the problem page only contains a single barcode page or that (B) the problem page contains a barcode page and part of what was supposed to be a document span. If the user selects option A, the file processing is simply continued. If, however, the user selects option B, the system asks the user how to process the problem page depending on the location of the barcodes on the problem page. The user may indicate that (A) the barcodes are located at the top of the problem page, the preceding document span can be processed normally but the following document span should be cancelled, that (B) the barcodes are located at the top of the problem page, the preceding document span can be processed normally and the following document span should include the problem page (meaning the barcodes are present in the resulting document), that (C) the barcodes are located at the bottom of the problem page, the preceding document span should be cancelled but the following document span can be processed normally, or that (D) the barcodes are located at the bottom of the problem page, the problem page should be included in the preceding document span, and the following document span can be processed normally.

Tracking System

In order to provide the user immediate feedback on the status of the faxes the user has submitted, the system provides a tracking mechanism whereby the user can view information about the faxes that the system has received from the user. The user can then access the system and perform various actions to correct the problems using the tracking system described below.

At each step in the fax processing and indexing process, as the system encounters errors with a particular fax, the system attempts to complete processing unaffected pages of the fax as appropriate. Once the system has processed a fax with problems, the sending user is alerted by email that there were unresolved problems with the fax. The user can then manually correct problems through a variety of actions.

FIG. 24 describes a data hierarchy for fax and indexing information and relationships stored at the host system database. Within FIG. 24, the following conventions are used to describe table columns and relationships. A line drawn between two tables indicates a foreign key relationship, with an arrow indicating the parent table. For example, the line drawn between tables 256 and 258, with the arrow pointing to table 258, indicates that primary key-foreign key relationship exists between the two tables, that table 258 is the parent table of this relationship, and that table 256 is the child. Each table column may denote additional properties. The letters "PK" next to a column indicate that the column is part of the primary key for that table. The letters "FK" next to a column indicate that it is the child of a primary key-foreign key relationship. The FK symbols also contain a number qualifier, such as "FK1" and "FK2," which discern between multiple keys of the same type within the same table.

For each fax that is received by the system, a row is added to table 258, FAXES, storing information about the fax. The system assigns each fax a unique ID (FAX_ID) and stores the following information about the fax: REMOTE_ID is used to store the Transmitting Station ID (TSID) that was received from the sending fax machine; STATUS indicates whether the fax has been submitted for indexing, if is known to have been interrupted (or is incomplete), if it is being held for possible matching, or if it is being held pending manual intervention; STATUS_TIMESTAMP indicates the date and time at which the STATUS column was last updated; SEVERITY indicates the severity of any problems found in the fax; PAGE_COUNT indicates how many pages were received and stored in the resulting file; COMBINED_FAX_ID stores a unique identifier of the composite file into which the fax has been incorporated based on interrupted transmission matching; COMBINED_ORDER indicates the location of this fax in the composite file relative to other faxes also used in the composite; DATE_CREATED indicates the date and time at which the system received the fax; XML_DATA stores ancillary information about the fax, including any page problems reported from the receiving fax device.

Each time the fax processing system submits a file to the indexing process, a row is added to table 250, INDEX_FILES. The system assigns each file a unique identifier (FILE_ID) and stores the following information about the file: USER_ID indicates the unique id of the user that generated the file and or barcodes contained therein; CREATOR_ID indicates the identifier of the user that submitted the file for indexing; SOURCE indicates the source of the file and may indicate that it was faxed or uploaded to the server; STATUS indicates the current status of the file in the indexing process; STATUS_TIMESTAMP indicates the date and time at which the STATUS was last updated; SEVERITY indicates the severity of any problems associated with the file; DATE_CREATED indicates the date and time at which the file was submitted for indexing; XML_DATA contains ancillary data about the file that is generated by the indexing process; ORIGINAL_FILE_ID indicates the FILE_ID from which a revision was generated; REVISION_NUMBER indicates the revision number of the file. It should be noted that USER_ID and CREATOR_ID differ in that USER_ID may be determined from barcode data read in the file, meaning that it may be updated as the file is processed. CREATOR_ID is known and stored at the time that the file is submitted for indexing and does not change.

Each time a fax or combined set of faxes is submitted to the indexing process, one or more rows are added to table 256, FAXES_TO_FILES. If a file in indexing came from a fax, a row is added to this table for each fax that was used to construct the file. For each such fax, the system stores the associated indexing file (FILE_ID), the fax (FAX_ID), the pages within the fax (PAGE_START and PAGE_END), and the order in which the fax was added to the composite file (COMBINED_ORDER). Most faxes submitted to indexing are not composite files, and, hence, only one row is added to this table.

Information about each user that can submit files for indexing is stored in table 252, USERS. The system assigns each user a unique identifier (USER_ID) and stores contact information about the user (FIRST_NAME, LAST_NAME, EMAIL, CONTACT_INFO).

Information about each sending fax machine is stored by the system in table 254, FAX_MACHINES. For each machine, the system stores the TSID sent from the fax machine (REMOTE_ID), the method of retries the fax machine has used in the past (RETRY_METHOD), the STATUS of the fax machine which may indicate that the fax processor should hold all faxes from a machine, the STATUS_CHANGED which indicates the date and time at which the status was last changed, and FLAGS which indicate various things about how the fax processor should process faxes received from the machine.

The system may associate one or more users with each fax machine stored in FAX_MACHINES. This association can be made manually by the system administrator or it can be made automatically when the system detects that a fax received from a certain fax machine contains information generated by a specific user. For each such association, a row is added to table 254, FAX_MACHINES_TO_USERS, storing the fax machine identifier (REMOTE_ID) and user identifier (USER_ID).

For each barcode sheet that stores a GUID which is associated with other information, as was described previously for ID-based coversheets, the system adds a row to table 262, COVERSHEETS. For each such coversheet, the system stores the GUID contained in the coversheet (ID), the identifier of the folder with which the coversheet is associated (FOLDER_ID), if any, the identifier of the document type with which the coversheet is associated (DOC_TYPE_ID), if any, the identifier of the notification type with which the coversheet is associated (NOTIFICATION_TYPE), if any, the user name and identifier of the user that generated the coversheet (CREATED_BY and CREATED_BY_ID), and the date and time at which the coversheet was generated (DATE_CREATED).

While one or more preferred embodiments of the invention have been described above, it should be understood that any and all equivalent realizations of the present invention are included within the scope and spirit thereof. The embodiments depicted are presented by way of example only and are not intended as limitations upon the present invention. Thus, it should be understood by those of ordinary skill in this art that the present invention is not limited to these embodiments since modifications can be made. Therefore, it is contemplated that any and all such embodiments are included in the present invention as may fall within the scope and spirit thereof.

What is claimed is:

1. A method for storing into a repository contents of an electronic transmission that includes multiple pages comprising one or more electronic documents, wherein the repository has a predetermined organizational structure and wherein the pages contain barcode data that defines information relating to storage of the one or more electronic documents within the organizational structure, comprising the steps of:
   a. providing an electronic data repository; and
   b. providing a non-transitory computer-readable carrier including a computer program that
      receives the electronic transmission from a party remote from the repository, identifies barcode data contained within the electronic transmission, analyzes the barcode data contained within the electronic transmission, identifies any of a predetermined set of errors based on the barcode data contained within the electronic transmission, and
      for each identified error,
         if the identified error is of a first type, notifies the remote party or an administrator associated with the electronic data repository of the error, and
         if the identified error is of a second type, notifies the remote party or the administrator of the identified error, presents the remote party or the administrator with a predetermined set of one or more corrective actions that correspond to the identified error and that are selectable by the remote party or the administrator, and receives instructions from the remote party or the administrator to effect a selected said one or more corrective actions.

2. The method of claim 1, wherein the electronic transmission includes multiple said electronic documents and wherein the barcode data comprises information describing organization of the multiple electronic documents within the electronic transmission.

3. A method for storing into a repository contents of an electronic transmission that includes multiple pages comprising one or more electronic documents, wherein the pages contain barcode data that defines information relating to the one or more electronic documents, comprising the steps of:
   a. providing an electronic data repository;
   b. receiving the electronic transmission from a party remote from the repository;
   c. identifying barcode data contained within the electronic transmission;
   d. analyzing the barcode data identified at step (c) and identifying any of a predetermined set of errors based on the barcode data identified at step (c);
   e. identifying, from a predetermined set of corrective actions, one or more predetermined corrective actions corresponding to an error identified at step (d); and
   f. communicating the one or more predetermined corrective actions to the remote party,
   wherein the barcode data contained in the pages of the electronic transmission include a first barcode that defines information relating to second barcodes that follow the first barcode in the electronic transmission, wherein the second barcodes define information that relates the second barcodes to each other, and wherein step (d) comprises
      reading the first barcode and identifying the information defined by the first barcode that relates to the second barcodes,
      reading the second barcodes,
      confirming the second barcodes conform to the information defined by the first barcode, and
      confirming the second barcodes conform to the information defined by the second barcodes that relate the second barcodes to each other.

4. The method as in claim 1, wherein the computer program sends an email to the remote party identifying the one or more predetermined corrective actions.

5. A system for storing into a repository contents of an electronic transmission that includes multiple pages and one or more electronic documents, wherein the repository has a predetermined organizational structure and wherein the pages contain barcode data that defines information relating to the storage of one or more electronic documents within the organizational structure, comprising:
   a computer with a non-transitory computer-readable medium having an electronic data repository; and
   a computer with a non-transitory computer-readable medium having a computer program configured to
      receive the electronic transmission from a party remote from the repository,
      identify barcode data contained within the electronic transmission,
      analyze the identified barcode data and identifying any of a predetermined set of errors based on the identified barcode data, and for each identified error,
         if the identified error is of a first type, notify the remote party or an administrator associated with the electronic data repository of the identified error,
         if the identified error is of a second type, notify the remote party or the administrator of the error, identify one or more predetermined corrective actions that correspond to the identified error and that are selectable by the remote party or the administrator, and
      receive instructions from the remote party or administrator to effect a selected said one or more predetermined corrective actions.

6. The system as in claim 5, wherein the electronic transmission is a facsimile transmission.

7. The system of claim 5, wherein the electronic transmission includes multiple said electronic documents and wherein the barcode data contained in the pages comprises information describing organization of the multiple electronic documents within the electronic transmission.

8. The system of claim 5, wherein the barcode data contained in the pages comprises information describing organization of the one or more electronic documents within the electronic data repository.

9. The method as in claim 1, wherein, if the identified error is of the first type, the computer program presents the remote party or the administrator with an option to confirm acknowledgement of the error and an option to ignore the error.

10. The method as in claim 1, wherein, if the identified error is of the second type, the computer program presents the remote party or the administrator with an option to enter instructions regarding storage of the one or more electronic documents.

11. The method as in claim 1, including the step of providing a facsimile receiver that receives the electronic transmission from the party remote from the repository, and wherein the computer program receives the electronic transmission from the party remote from the repository.

\* \* \* \* \*

UNITED STATES PATENT AND TRADEMARK OFFICE
CERTIFICATE OF CORRECTION

PATENT NO. : 8,009,307 B2  Page 1 of 1
APPLICATION NO. : 10/359979
DATED : August 30, 2011
INVENTOR(S) : Michael J. Shutt and Matthew Todd Hodge It is certified that error appears in the above-identified patent and that said Letters Patent is hereby corrected as shown below:

Title Page, Inventors, Delete "(76)" and insert --(75)--.

Title Page, Insert --(73) Assignee: Advectis, Inc., Alpharetta, GA (US)--.

Signed and Sealed this
Eighth Day of January, 2013

David J. Kappos
*Director of the United States Patent and Trademark Office*

UNITED STATES PATENT AND TRADEMARK OFFICE
CERTIFICATE OF CORRECTION

| | |
|---|---|
| PATENT NO. | : 8,009,307 B2 |
| APPLICATION NO. | : 10/359979 |
| DATED | : August 30, 2011 |
| INVENTOR(S) | : Michael J. Shutt et al. |

It is certified that error appears in the above-identified patent and that said Letters Patent is hereby corrected as shown below:

This certificate supersedes the Certificate of Correction issued January 8, 2013. The certificate is vacated since petition to correct assignee under 3.81 (b) was not granted. The Certificate of Correction was published in error and should not have issued.

Signed and Sealed this
Twenty-third Day of April, 2013

Teresa Stanek Rea
*Acting Director of the United States Patent and Trademark Office*